United States Patent
Seki

(10) Patent No.: US 7,384,155 B2
(45) Date of Patent: Jun. 10, 2008

(54) IMAGE DISPLAY

(75) Inventor: Shigeyuki Seki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 165 days.

(21) Appl. No.: 11/338,810

(22) Filed: Jan. 25, 2006

(65) Prior Publication Data

US 2007/0008496 A1 Jan. 11, 2007

(30) Foreign Application Priority Data

Jan. 28, 2005 (JP) ............................. 2005-021778

(51) Int. Cl.
*G03B 21/16* (2006.01)
*G03B 21/18* (2006.01)
*G03B 21/22* (2006.01)
*H04N 5/76* (2006.01)
*H04N 5/64* (2006.01)
*H05K 7/20* (2006.01)

(52) U.S. Cl. ............................ 353/60; 353/57; 353/61; 353/74; 353/79; 348/748; 348/787; 361/688

(58) Field of Classification Search ................... 353/60, 353/47, 52, 56, 57, 61, 74–79, 58; 348/748, 348/787, 789, 794, 836; 349/161; 361/688, 361/695; 359/453, 456, 460
See application file for complete search history.

(56) References Cited

U.S. PATENT DOCUMENTS 6,814,446 B2 * 11/2004 Yamada et al. ............... 353/60

FOREIGN PATENT DOCUMENTS

| JP | A-5-343875 | 12/1993 |
|---|---|---|
| JP | A-6-153127 | 5/1994 |
| JP | A-7-236805 | 9/1995 |
| JP | A-3-304739 | 11/1996 |
| JP | A-9-98360 | 4/1997 |
| JP | A-9-102689 | 4/1997 |
| JP | A-9-130711 | 5/1997 |
| JP | A-10-97000 | 4/1998 |
| JP | A-11-84533 | 3/1999 |
| JP | A-11-87966 | 3/1999 |
| JP | A-11-191685 | 7/1999 |
| JP | A-2000-299583 | 10/2000 |
| JP | A-2001-188304 | 7/2001 |
| JP | A-2001-209119 | 8/2001 |
| JP | A-2001-209125 | 8/2001 |
| JP | A-2002-101363 | 4/2002 |
| JP | A-2003-337377 | 11/2003 |

* cited by examiner

*Primary Examiner*—Rochelle-Ann Blackman
(74) *Attorney, Agent, or Firm*—Oliff & Berridge, PLC

(57) ABSTRACT

An image display, includes: an image display section for forming and displaying an image in accordance with image information to be input; and a casing for housing the image display section, in which the casing includes: a lateral portion visible from an outside, the image display section being exposed from the lateral portion; and a bottom portion extending from a lower end of the lateral portion toward a rear side of the device, an opening for introducing air outside the casing is formed in the bottom portion, and an air filter for cleaning the air passing the opening is provided at the opening such that the air filter can be inserted to/removed from the lateral portion.

11 Claims, 11 Drawing Sheets

IMAGE DISPLAY

The entire disclosure of Japanese Patent Application No. 2005-21778, filed Jan. 28, 2005, is expressly incorporated by reference herein.

BACKGROUND

1. Technical Field

The present invention relates to an image display including an image display section for forming and displaying an image in accordance with image information to be input, and a casing for housing the image display section.

2. Related Art

Recently, projectors have widely been used for home theater purposes at home. As this kind of projector, there has been known a rear projector including a light source, an optical modulator for modulating a light beam irradiated by the light source in accordance with image information to form an image, a projection lens for projecting the image formed by the optical modulator in an enlarged manner, a light-transmissive screen on which the image projected by the projection lens is projected to display the image, a control board for controlling driving of a device body, a power source device for supplying driving power to the above-mentioned components, and a casing for housing the components. In the case of such rear projector, the formed image is projected on the screen from a rear side, so that the image displayed on the screen is visible by a viewer from a front side.

When the rear projector is driven, the optical components such as the light source device, the optical modulator etc., and the power source device etc. are in high-temperature state, whereas many of these components are heat-sensitive. Therefore, in order to stably drive the rear projector, the components should be cooled effectively. Owing to this, there has been known a rear projector, which takes cooling air from the outside to blow and cool the components with the cooling air (for example, see Document 1: JP-A-2003-337377, page 6, FIG. 6).

The rear projector disclosed in Document 1, when the rear projector is seen from a front side with a screen attached thereto, is formed with a cooling path, which introduces the cooling air from an outside of the casing via intake openings respectively formed in a left side surface as well as in a rear side surface of the casing (lower cabinet), circulates the cooling air to the optical device for forming the image, the control board, the power source device and the light source device for cooling these components, and then discharges the cooling air to the outside via an exhaust opening formed in a right side surface. In addition, an air filter is provided on an inner side of each intake opening for removing dust etc. from the air to be introduced inside the casing. With this arrangement, the components of the rear projector can effectively be cooled as well as the inside of the casing can be kept clean since the air filter can prevent the dust etc. from entering to the inside of the casing.

However, with the rear projector disclosed in Document 1, since the air filter is provided on the inner side of the intake opening formed in the left side surface of the casing, the air filter may be difficult to be replaced. To be more specific, in order to replace the air filter, the rear projector should be moved from an installation site so that the intake opening provided with the air filter is exposed. However, the rear projector tends to be large in recent years, resulting in difficulty of moving the rear projector. Owing to the difficulty of moving the rear projector, replacement of the air filter may be troublesome.

Meanwhile, the air filter should be replaced periodically, and when not, the air filter may be clogged and unable to introduce the air. In such state, the components of the rear projector may not be cooled properly, which possibly causes a trouble in driving of the rear projector.

In the light of such circumstances, there has been desired a rear projector with an easily replaceable air filter.

SUMMARY

An object of the invention is to provide an image display with an easily replaceable air filter that removes dust etc. contained in air to be introduced to an inside of a casing.

An image display according to an aspect of the invention, in order to achieve the above-described object, includes: an image display section for forming and displaying an image in accordance with image information to be input; and a casing for housing the image display section, in which the casing includes: a lateral portion visible from an outside, the image display section being exposed from the lateral portion; and a bottom portion extending from a lower end of the lateral portion toward a rear side of the device, an opening for introducing air outside the casing is formed in the bottom portion, and an air filter for cleaning the air passing the opening is provided at the opening such that the air filter can be inserted to/removed from the lateral portion.

With this arrangement, the air filter for removing dust etc. contained in the air introduced from the outside via the opening that is formed in the bottom portion of the casing is attached such that the air filter can be inserted to/removed from the lateral portion of the casing, from which the image display section is exposed. Owing to this, since the air outside the casing is introduced to the inside via the air filter, the clean air with the dust etc. removed can be taken, and also, when the air filter gets dirt with the dust etc., the air filter can be removed for replacement from the side of viewing the image display. Thus, the air filter can easily be replaced without moving the image display.

Preferably in the above-described image display, the casing may include a leg for defining an air layer between a mount surface on which the casing is mounted and the bottom portion, and an intake port for introducing the air outside the casing may be formed at the opening of the leg.

With this arrangement, the air layer is formed between the opening for introducing the air outside the casing to the inside and the mount surface by way of the leg provided to the casing. Also, the intake port is formed at the leg for introducing the air outside the casing to the opening. Owing to this, when the casing is mounted on the mount surface, the opening formed in the bottom portion will not be closed, thereby securely introducing the air of the outside to the inside of the casing. Thus, the introduction path of the cooling air can reliably be secured.

Preferably, in the above-described image display, the leg may be provided on at least a side confronting the lateral portion, and the intake port may be formed in the leg on the side confronting the lateral portion.

With this arrangement, the intake port is formed in the leg on the side confronting the lateral portion of the casing, from which the image display section is disposed, namely, in the leg on the rear side. Owing to this, the intake port can be less noticeable. Thus, the appearance of the image display can be excellent.

Preferably, in the above-described image display, the image display portion may include: a light source; an optical modulator for modulating a light beam irradiated by the light source in accordance with image information; and a screen on which an image formed by the optical modulator is projected, and a duct may be provided on the bottom portion, an end of the duct being connected to the opening and the other end of the duct being connected to a lower side of at least one of the optical modulator and the optical converter, and the duct guiding the air introduced from the opening to the at least one of the optical modulator and the optical converter.

There can be exemplified a liquid crystal panel in which a driving board and an opposing board each made of glass or the like are disposed with a predetermined space via a seal member and liquid crystal is sealed between the boards as the optical modulator, or a DMD (Digital Micro-mirror Device: trade mark of Texas Instruments Incorporated) as a reflective optical modulator that modulates a light beam irradiated by a light source in accordance with image information.

Also, as the optical converter, a polarization converter, a polarization film, a polarization plate, or the like that irradiates an incident light beam after aligning a polarization direction may be exemplified.

In the case where the image display section includes the light source, the optical modulator, the optical converter, and the screen, since the light beam irradiated by the light source is then irradiated on the optical modulator and the optical converter, the optical modulator and the optical converter tend to be hot particularly. Meanwhile, the optical modulator and the optical converter may be heat-denatured, and when the optical modulator and the optical converter are heat-denatured, the image may not properly be formed, e.g., the image to be formed may be deteriorated. Therefore, the optical modulator and the optical converter should be cooled properly.

In the light of such problem, the invention can securely circulate the air, which is introduced from the opening to the inside of the casing, toward the at least one of the optical modulator and the optical converter, by the provision of the duct connecting the opening formed in the bottom portion with the at least one of the optical modulator and the optical converter. Therefore, the at least one of the optical modulator and the optical converter can securely be cooled.

Preferably in the image display, a cooling fan may be provided to an upper side of the at least one of the optical modulator and the optical converter with the duct being connected to the lower side thereof, the cooling fan cooling the at least one of the optical modulator and the optical converter, and an intake surface of the cooling fan may confront the at least one of the optical modulator and the optical converter with the cooling fan being disposed to the upper side thereof.

With this arrangement, the cooling fan is disposed above the at least one of the optical modulator and the optical converter such that the intake surface of the cooling fan faces thereto. Owing to this, the air being introduced from the outside of the casing via the opening formed in the bottom portion and circulating to the lower side of the at least one of the optical modulator and the optical converter with the duct connected is sucked by the driving of the cooling fan, and securely circulates to the at least one of the optical modulator and the optical converter. Thus, the optical modulator or the optical converter can properly be cooled.

In addition, the intake surface of the cooling fan is positioned so as to confront the cooling subject with the cooling fan arranged above, i.e., to confront the at least one of the optical modulator and the optical converter. With this arrangement, by the driving of the cooling fan, the air in the vicinity of the opening on the other end side of the duct circulates along the at least one of the optical modulator and the optical converter to cool it, and is then collected toward the intake surface of the cooling fan.

However, when an exhaust surface of the cooling fan confronts the cooling subject, the air may blow only a partial area of the cooling subject confronting the exhaust surface. In such case, since the air blown to the partial area cannot keep a discharging pressure thereof at the time discharged from the cooling fan, the air may not blow other area, thus only partially cooling the cooling subject.

In contrast, since the intake surface of the cooling fan confronts the cooling subject, when the cooling fan is driven, the vicinity of the cooling subject located on the intake side of the cooling fan becomes negative pressure, thereby forming a flow path of the air with a predetermined wind pressure kept, in the vicinity of the cooling subject. Due to this, the air can surely circulate to the cooling subject located on the flow path, i.e., the at least one of the optical modulator and the optical converter, thereby preventing the air from staying. Accordingly, cooling efficiency of the at least one of the optical modulator and the optical converter can further be enhanced.

A rear projector according to another aspect of the invention, includes: a light source; an optical modulator for modulating a light beam irradiated by the light source in accordance with image information; a projection lens for projecting the light beam irradiated from the optical modulator on a screen; and a casing for housing the light source, the optical modulator and the projection lens, in which the casing includes a bottom portion, a front portion, a rear portion and left and right lateral portions, the screen is held at the front portion, a frame leg is provided, the frame leg being extended from an outer edge of the bottom portion to a mount surface on which the casing is mounted, the frame leg defines a space between the bottom portion and the mount surface on which the casing is mounted, an intake port is provided in the frame leg, the intake port introducing to the space a cooling air for cooling electric components housed in the casing, a first opening is formed in the bottom portion, the first opening introducing inside the casing the cooling air introduced from the intake port in the space, and an air filter for cleaning air passing the first opening is provided at the first opening such that the air filter can be inserted to/removed from the front portion.

With this arrangement, the frame leg is provided, which is extended from the outer edge of the bottom portion to the mount surface on which the casing is mounted, the frame leg defines the space between the bottom portion and the mount surface on which the casing is mounted, the intake port is provided in the frame leg, the intake port introducing to the space the cooling air for cooling the electric components housed in the casing, and the first opening is formed in the bottom portion, the first opening introducing inside the casing the cooling air introduced to the space from the intake port. Owing to this, when the casing is mounted on the mount surface, the first opening formed at the bottom portion will not be closed, thereby securely introducing the air of the outside to the inside of the casing. Thus, securely ensuring the introduction path of the cooling air.

With this arrangement, the air filter for removing dust etc. contained in the air introduced from the outside via the opening that is formed in the bottom portion of the casing is attached such that the air filter can be inserted to/removed from the front portion of the casing. Owing to this, since the air outside the casing is introduced to the inside via the air filter, the clean air with the dust etc. removed can be taken, and also, when the air filter gets dirt with the dust etc., the air filter can be removed for replacement from the side of viewing the image display. Thus, the air filter can easily be replaced without moving the rear projector.

Preferably in the above-described rear projector, the intake port may be formed on a rear portion side.

Owing to this, the intake port can be less noticeable. Thus, the appearance of the image display can be excellent.

Preferably in the above-described rear projector, a second opening may be formed in the bottom portion, the second opening introducing inside the casing the cooling air introduced from the intake port in the space, the first opening may be located on an extending line connecting the intake port and the second opening, and a partition wall may be formed on the bottom portion, the partition wall separating a flow path of the cooling air from the intake port to the first opening, and a flow path of the cooling air from the intake port to the second opening.

With this arrangement, the cooling air securely circulates to both of the first opening and the second opening. Therefore, the cooling air introduced to the inside of the casing from the openings can securely and properly cool the respective components inside the casing.

Preferably in the above-described rear projector may further may include: an optical converter provided between the light source and the optical modulator, the optical converter converting the light beam irradiated by the light source into a uniform linear polarization light, in which a duct may be provided on the bottom portion, an end of the duct being connected to the first opening and the other end of the duct being connected to a lower side of at least one of the optical modulator and the optical converter, the duct guiding to the at least one of the optical modulator and the optical converter the air introduced from the opening to an inside of the casing.

There can be exemplified a liquid crystal panel in which a driving board and an opposing board each made of glass or the like are disposed with a predetermined space via a seal member and liquid crystal is sealed between the boards as the optical modulator, or a DMD (Digital Micro-mirror Device: trade mark of Texas Instruments Incorporated) as a reflective optical modulator that modulates a light beam irradiated by a light source in accordance with image information.

Also, as the optical converter, a polarization converter, a polarization film, a polarization plate, or the like that irradiates an incident light beam after aligning a polarization direction may be exemplified.

The optical modulator and the optical converter tend to be hot particularly. Meanwhile, the optical modulator and the optical converter may be heat-denatured, and when the optical modulator and the optical converter are heat-denatured, the image may not properly be formed. Therefore, the optical modulator and the optical converter should be cooled properly.

In the light of such problem, the invention can securely circulate the air, which is introduced from the opening to the inside of the casing, toward the at least one of the optical modulator and the optical converter, by the provision of the duct connecting the opening formed in the bottom portion with the at least one of the optical modulator and the optical converter. Therefore, the at least one of the optical modulator and the optical converter can securely be cooled.

Preferably in the above-described rear projector, the duct may have a profile protruding to an upper side and a lower side of the bottom portion.

Since the frame leg defines the space below the bottom portion, i.e., between the bottom portion and the mount surface on which the casing is mounted, a sectional area of the duct can be enlarged by effectively using the space. Accordingly, by enlarging the sectional area of the duct, the cooling air can effectively circulate. Accordingly, cooling efficiency of the at least one of the optical modulator and the optical converter can further be enhanced.

Preferably in the above-described rear projector, a cooling fan may be provided to an upper side of the at least one of the optical modulator and the optical converter with the duct being connected to the lower side thereof, the cooling fan cooling the at least one of the optical modulator and the optical converter, and an intake surface of the cooling fan may confront the at least one of the optical modulator and the optical converter with the cooling fan being disposed to the upper side thereof.

With this arrangement, the cooling fan is disposed above the at least one of the optical modulator and the optical converter such that the intake surface of the cooling fan faces thereto. Owing to this, the air being introduced from the outside of the casing via the opening formed in the bottom portion and circulating to the lower side of the at least one of the optical modulator and the optical converter with the duct connected is sucked by the driving of the cooling fan, and securely circulates to the at least one of the optical modulator and the optical converter. Thus, the optical modulator or the optical converter can properly be cooled.

In addition, the intake surface of the cooling fan is positioned so as to confront the cooling subject with the cooling fan arranged above, i.e., to confront the at least one of the optical modulator and the optical converter. With this arrangement, by the driving of the cooling fan, the air in the vicinity of the opening on the other end side of the duct circulates along the at least one of the optical modulator and the optical converter to cool it, and is then collectively supplied to the intake surface of the cooling fan.

However, an exhaust surface of the cooling fan confronts the cooling subject, the air may blow only a partial area of the cooling subject confronting the exhaust surface. In such case, since the air blown to the partial area cannot keep a discharging pressure thereof at the time discharged from the cooling fan, the air may not blow other area, thus only partially cooling the cooling subject.

In contrast, since the intake surface of the cooling fan confronts the cooling subject, when the cooling fan is driven, the vicinity of the cooling subject located on the intake side of the cooling fan becomes negative pressure, thereby forming a flow path of the air with a predetermined wind pressure kept, in the vicinity of the cooling subject. Due to this, the air can surely circulate to the cooling subject located on the flow path, i.e., the at least one of the optical modulator and the optical converter, thereby preventing the air from staying. Accordingly, cooling efficiency of the at least one of the optical modulator and the optical converter can further be enhanced.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

An exemplary embodiment of a rear projector of the invention will be described below with reference to the attached drawings.

Figure 1:
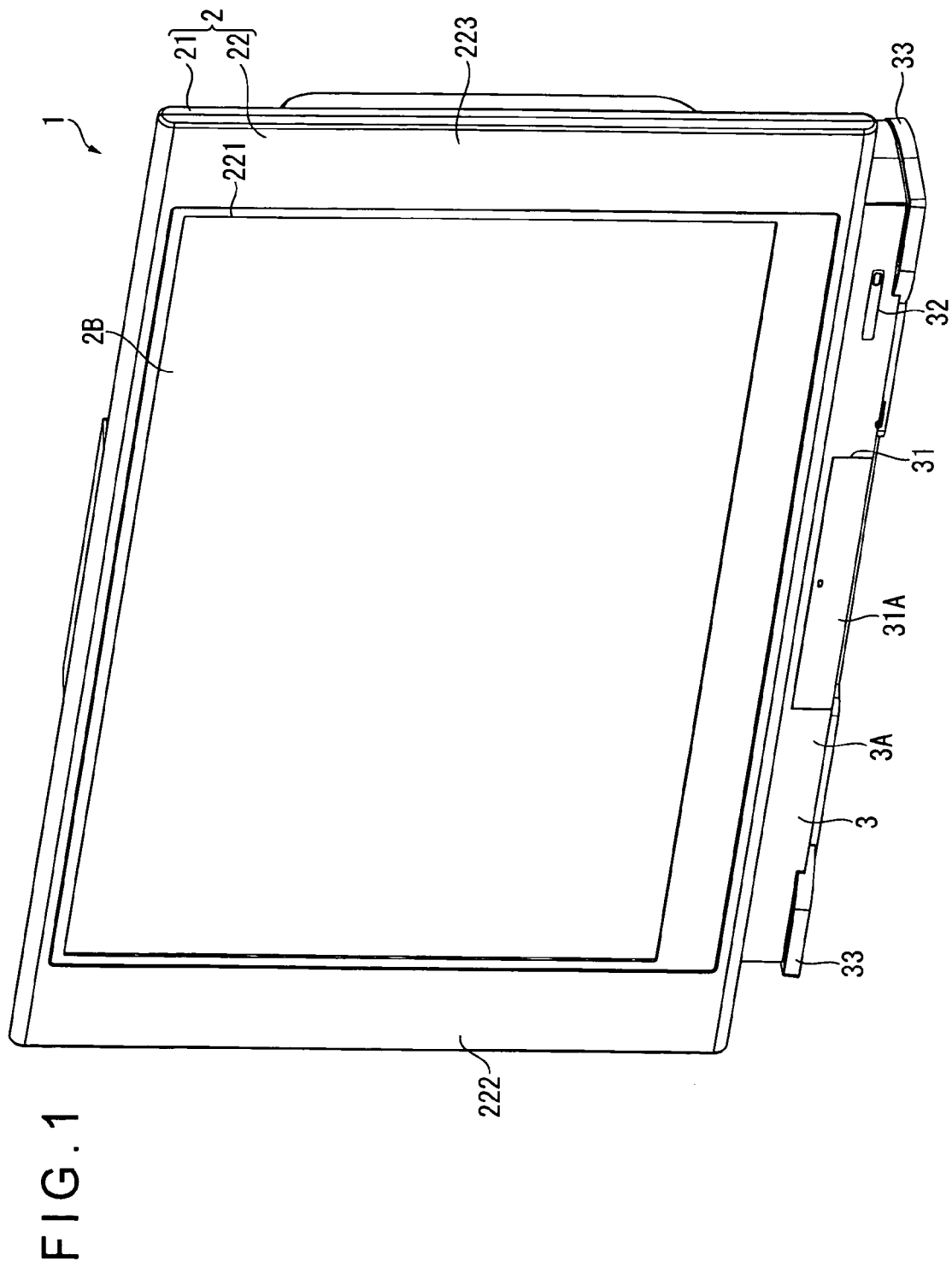
FIG. 1 is a perspective view showing a front side of a rear projector according to an exemplary embodiment of the invention.
Figure 2:
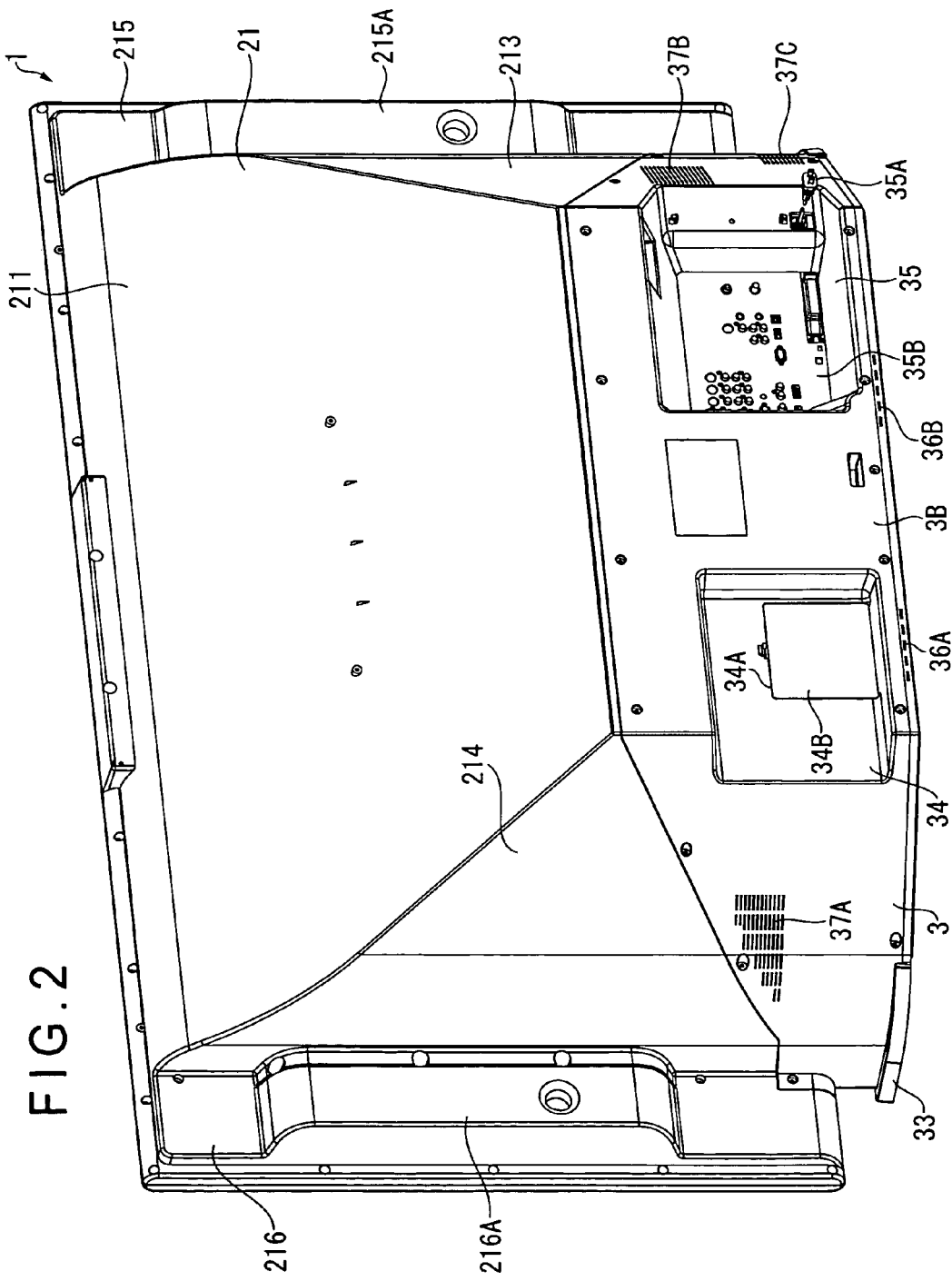
FIG. 2 is a perspective view showing a rear side of the rear projector of aforesaid embodiment.
Figure 3:
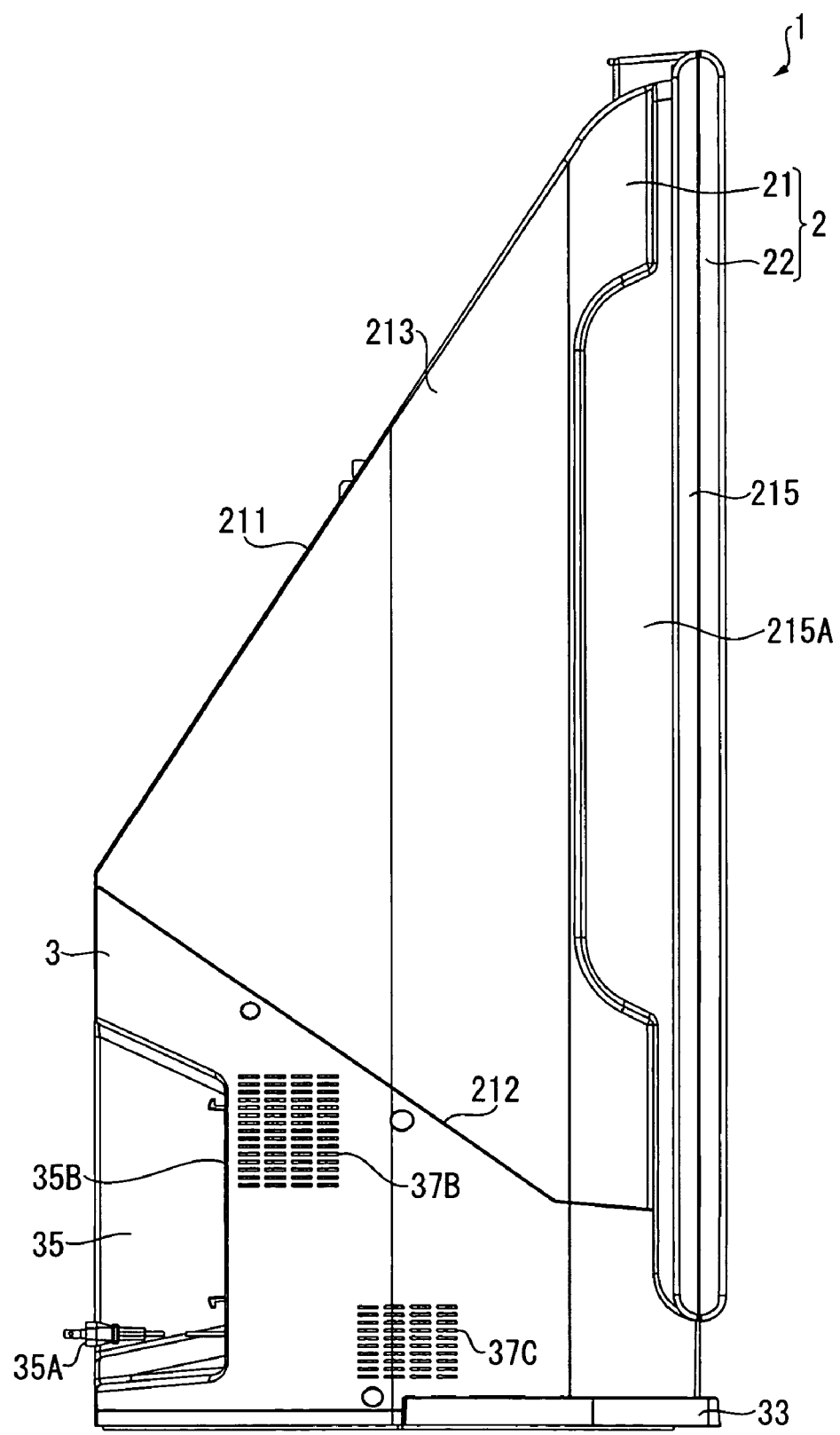
FIG. 3 is a side elevation showing a left side of the rear projector of aforesaid embodiment.

FIG. 1 is a perspective view showing a front side of the rear projector 1 according to the present exemplary embodiment. FIG. 2 is an illustration showing a rear side of the rear projector 1, and FIG. 3 is an illustration showing a left side of the rear projector 1. Note that the left side mentioned in FIG. 3 is a left side of the rear projector 1 when seen from a front side.

The rear projector 1 as an image display modulates a light beam irradiated by a light source in accordance with image information to form an optical image, and projects the formed optical image on a light-transmissive screen 2B, which is provided with the rear projector 1, in an enlarged manner.

1. External Configuration

As shown in FIGS. 1 to 3, the rear projector 1 being a substantially rectangular profile when seen from the front side includes an upper cabinet 2 having a substantially triangular longitudinal section, and a lower cabinet 3 for supporting the upper cabinet 2 from a lower side. The upper cabinet 2 and the lower cabinet 3 are fixed to each other by a screw etc.

As shown in FIG. 1 the upper cabinet 2 includes a mirror case 21 for housing a later described reflection mirror 2A (FIG. 4), and a screen frame 22 for holding the screen 2B.

The lower cabinet 3 is a box casing substantially being a trapezoid in plan view that supports the upper cabinet 2 and houses main components of the rear projector 1.

1-1. Front Configuration of Rear Projector 1

As shown in FIG. 1, the screen frame 22 is disposed on the front side of the rear projector 1, namely, on the front side of the upper cabinet 2.

The screen frame 22 is formed in a substantially rectangular profile in front view with substantially the same size as a dimension on the front side of the below-described mirror case 21 (FIG. 2), the screen frame 22 being fixed on the front side of the mirror case 21 with a screw etc.

The screen frame 22 holds the screen 2B on which the optical image is projected as described above. Accordingly, a substantially rectangular opening 221 having the same size as an optical image projection area of the screen 2B is formed substantially at the center of the screen frame 22, so that the screen 2B is exposed from the opening 221. Also, speaker setting portions 222, 223, to which each of two speakers (not shown) are respectively disposed on the rear left and right sides of the speaker setting portions 222, 223, are formed on both lateral sides of the opening 221.

Figure 4:
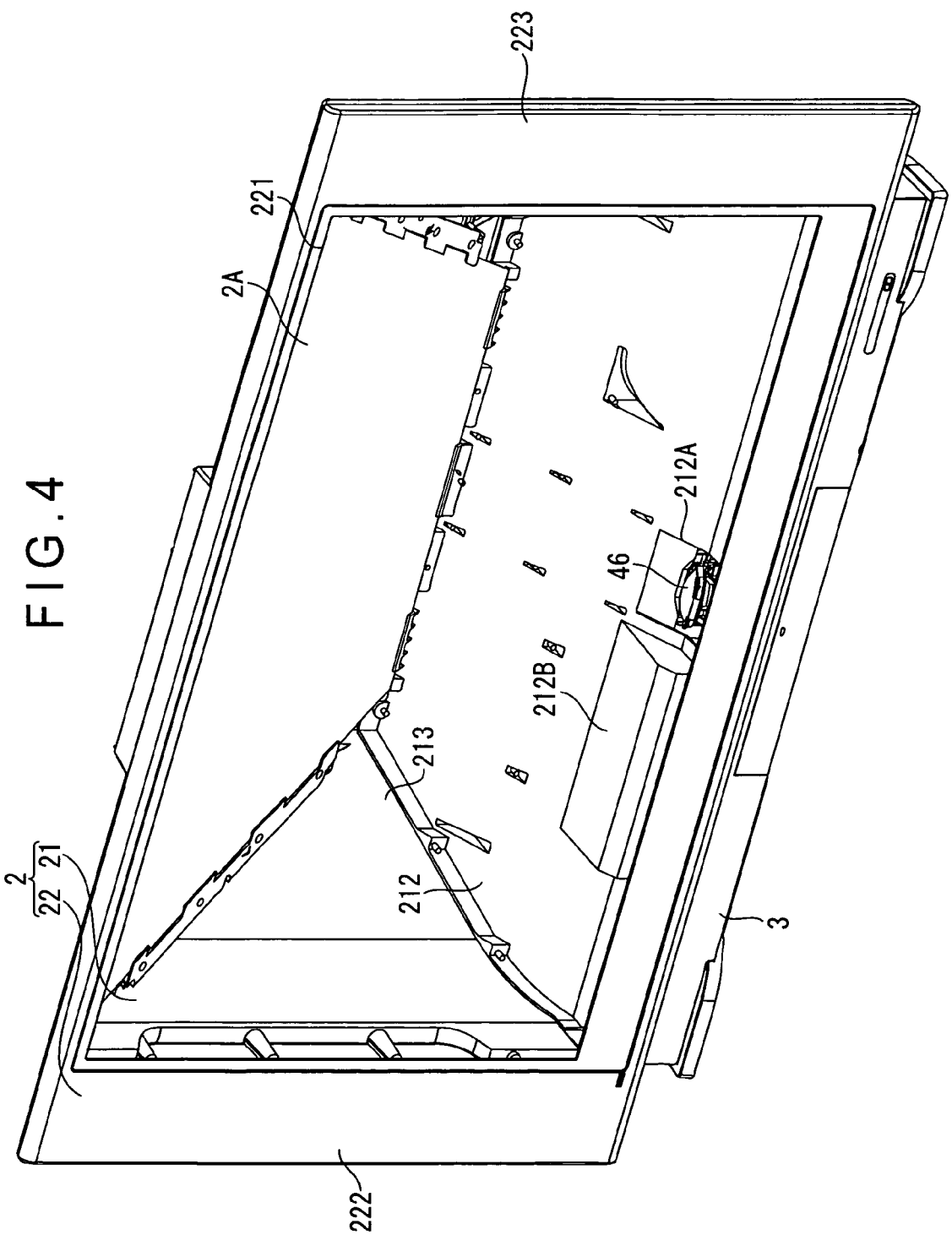
FIG. 4 is a perspective view showing an internal configuration of an upper cabinet of aforesaid embodiment.

Note that the screen 2B corresponds to an image display section of the invention, which is provided with a Fresnel sheet, a lenticular sheet, and a protection plate such as a glass plate. The Fresnel sheet parallelizes the light beam irradiated from a projection lens of a below-described optical unit and then reflected by the below-described reflection mirror 2A (FIG. 4). The lenticular sheet diffuses the light beam passed through the Fresnel sheet and then parallelized to make a display image be properly visible.

A front portion 3A of the lower cabinet 3 is a surface on the same side as a surface where the screen 2B is exposed when the lower cabinet 3 is connected to the upper cabinet 2.

A substantially rectangular opening 31 is formed substantially at the center of the front portion 3A, and a lid member 31A is provided thereto for closing and opening the opening 31 by being vertically rotated.

Figure 5:
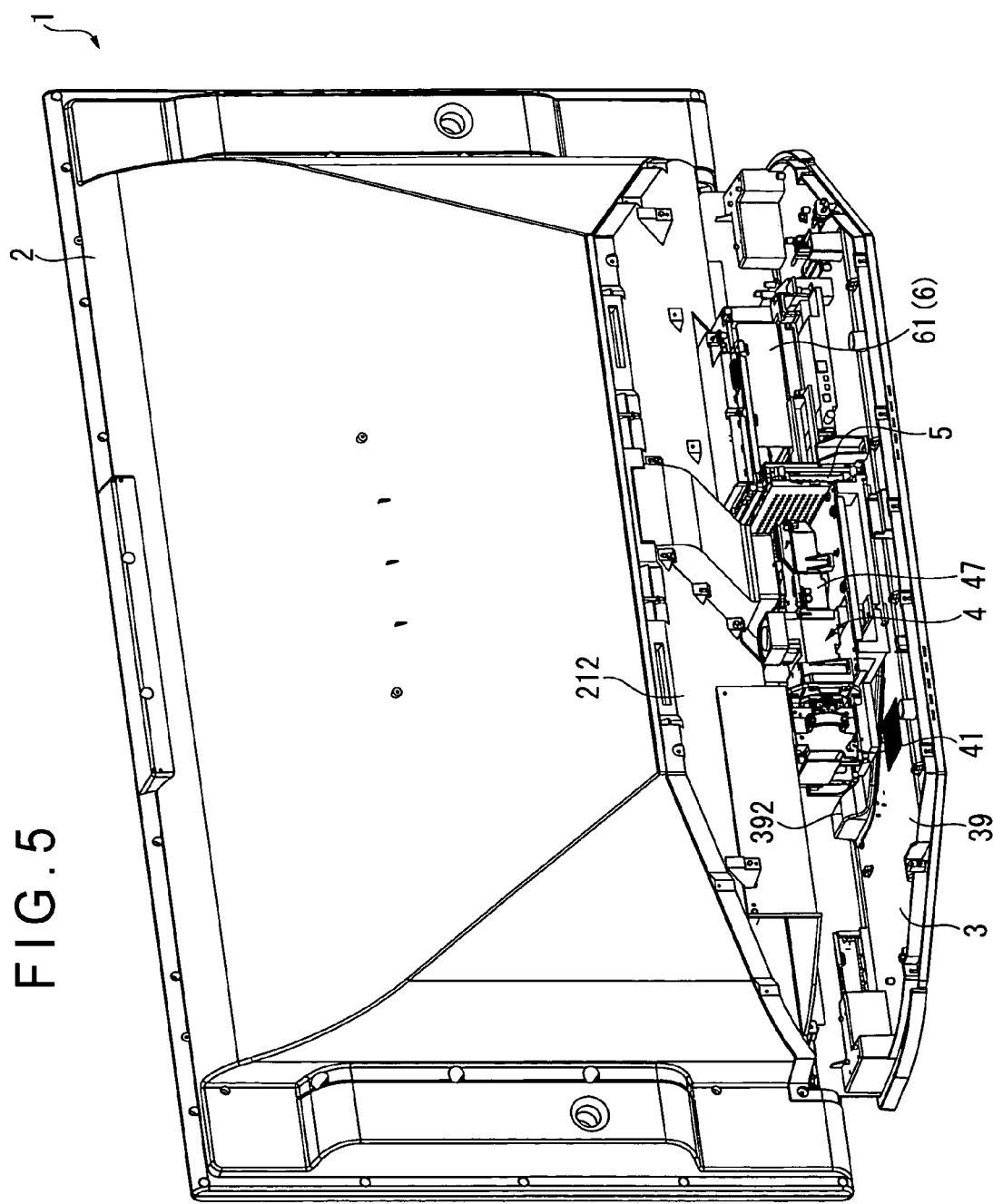
FIG. 5 is a perspective view showing an internal configuration of a lower cabinet of aforesaid embodiment.

Thought not shown in detail, a front panel as a front side operation panel is provided inside the opening 31. Arranged on a left portion of the front panel are various operation switches for volume adjustment, image quality adjustment etc., a D-Sub terminal as a PC (Personal Computer) connecting terminal, a stereophonic sound input terminal, a video input terminal, an S terminal, and the like. On a right portion of the front panel, an opening to which a certain semiconductor memory card can be inserted is formed, and a card reader for reading out data from the card is disposed inside the opening. A power source switch 32 is provided on a right side of the opening 31. The front panel and the power source switch 32 are electrically connected to a below-described control board 5 (FIG. 5).

Also, legs 33 are formed on both lateral ends on the front side of the lower cabinet 3.

1-2. Rear Configuration of Rear Projector 1

As shown in FIGS. 2 and 3, the rear side of the rear projector 1 is defined by the mirror case 21 of the upper cabinet 2 and the lower cabinet 3.

The mirror case 21 is a box casing made of a synthetic resin and having a substantially triangular longitudinal section. The mirror case 21 is constituted by a rear wall 211 defining the rear side of the rear projector 1, a bottom wall 212 connected to a lower end of the rear wall 211, and a pair of side walls 213, 214 located on both lateral sides of the rear wall 211 and the bottom wall 212. Also, extended portions 215, 216 are formed on the front side of the mirror case 21, the extended portions 215, 216 extending in a direction away from each other, namely, in a horizontal direction of the rear projector 1 and being substantially orthogonal to the side walls 213, 214.

The rear wall 211 is substantially trapezoidal in plan view with a long side thereof located on an upper side, and is formed to be slanted toward a lower rear side. The below-described reflection mirror 2A (FIG. 4) is supported on a surface on an inner side of the rear wall 211 at a predetermined angle.

A pair of side walls 213, 214 are formed to connect both the lateral ends of the rear wall 211 and the bottom wall 212, and to be slanted inwardly toward the rear side.

The extended portions 215, 216 are formed larger than a vertical dimension of the side walls 213, 214, bulged portions 215A, 216A bulged toward a rear side direction being formed substantially at the center thereof. The bulged portions 215A, 216A form speaker enclosures respectively together with the speaker setting portions 222, 223 (FIG. 1) of the screen frame 22.

As described above, the lower cabinet 3 is formed to be substantially a trapezoid in plan view corresponding to the profile in plan view of the upper cabinet 2, the lower cabinet 3 being a box casing with four sides thereof surrounded by side walls.

A rear portion 3B of the lower cabinet 3 is a surface opposite to the front portion 3A, a first recess 34 being formed on a left side in FIG. 2 of the rear portion 3B and a second recess 35 being formed on a right side thereof.

The first recess 34 is provided with a substantially square lamp replacement opening 34A, which is covered by a lamp cover 34B. The lamp replacement opening 34A is opened by removing the lamp cover 34B, so that a light source device 41 (FIGS. 5 and 8) of a below-described optical unit 4 can be replaced through the lamp replacement opening 34A.

The second recess 35 is provided with a power source cable 35A and a rear panel 35B as a rear side operation panel. Specifically, a DVI (Digital Visual Interface) terminal as a PC connecting terminal, an antenna input terminal, and multiple video/audio I/O terminals are arranged on the rear panel 35B.

In addition, intake ports 36 (36A, 36B) that introduce cooling air to cool electric components housed inside the lower cabinet 3 are formed on lower sides of the first and second recesses 34, 35.

Further, exhaust ports 37 (37A, 37B, 37C) are formed on the left side of the first recess 34 and the right side of the second recess 35. The exhaust ports 37A to 37C are slit-like openings for discharging the air after cooling the devices in the lower cabinet 3.

2. Internal Configuration 2-1. Internal Configuration of Upper Cabinet 2

FIG. 4 is an illustration showing an internal configuration of the upper cabinet 2. Specifically, FIG. 4 is a perspective view showing the front side of the rear projector 1 with the screen 2B being removed from the state shown in FIG. 1.

Figure 8:
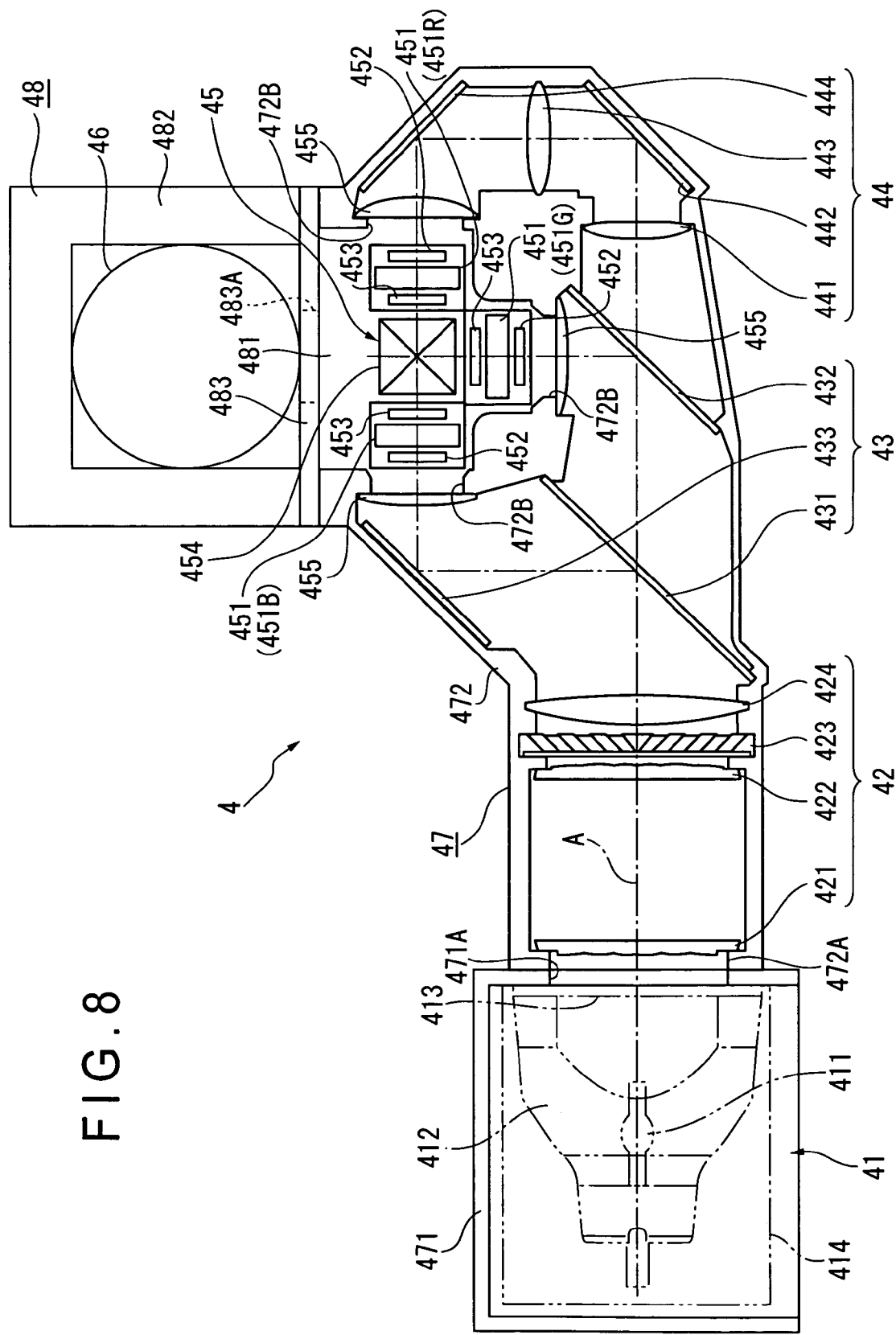
FIG. 8 is a schematic illustration showing an optical system of the optical unit of aforesaid embodiment.

As shown in FIG. 4, the reflection mirror 2A is housed inside the upper cabinet 2, the reflection mirror 2A reflecting the light beam as an optical image irradiated from the projection lens 46 (FIG. 8) of the below-described optical unit 4 (FIGS. 5 and 8) that is provided inside the lower cabinet 3. The reflection mirror 2A is a typical mirror substantially formed in a trapezoid in plan view which is substantially the same as the profile of the rear wall 211 (FIG. 2), and is attached on the inner side of the rear wall 211 (FIG. 2) of the upper cabinet 2 in a slant manner such that a long side of the trapezoid is located on an upper side. A slant angle of the reflection mirror 2A is set according to a set positional relationship of the screen 2B (FIG. 1) attached on the front side with respect to reflection of the video image by the projection lens 46 of the below-described optical unit 4 (FIGS. 5 and 8).

The bottom wall 212 of the mirror case 21 is substantially a trapezoid in plan view with a long side thereof located on the front side. As shown in FIGS. 2 and 3, the bottom wall 212 is slanted toward the upper side as shifting to the rear side, and connected to the rear wall 211 at an end thereof on the rear side and to the side walls 213, 214 at lateral ends thereof.

As shown in FIG. 4, a substantially rectangular cut portion 212A is formed substantially at a center on the front side of the bottom wall 212, the projection lens 46 of the below-described optical unit 4 (FIGS. 5 and 8) being to be exposed through it. In addition, a bulged portion 212B bulged upwardly is formed on a left side of the cut portion 212A. The bulged portion 212B is formed at a position corresponding to a power source block 61 (FIG. 5) of the below-described power source unit 6 (FIG. 5).

2-2. Internal Configuration of Lower Cabinet 3

Figure 6:
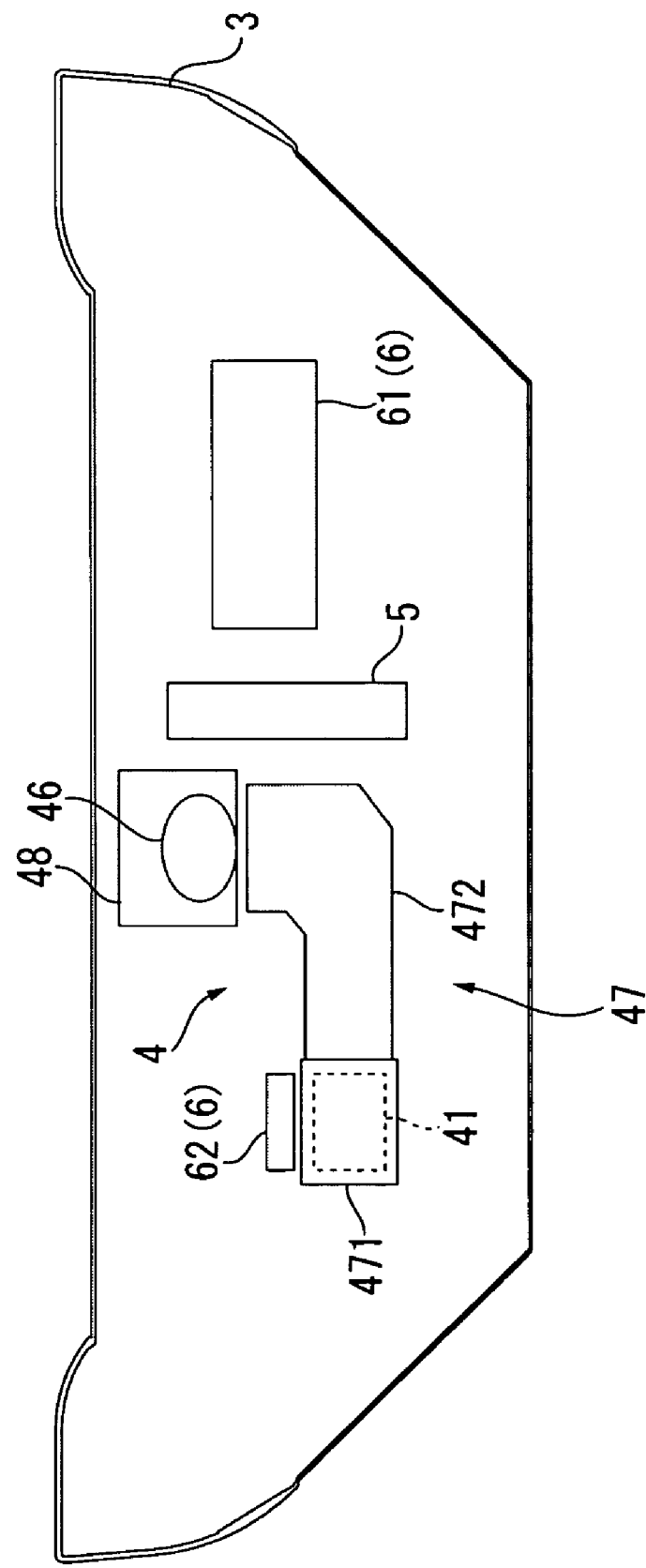
FIG. 6 is a schematic illustration showing the internal configuration of the lower cabinet of aforesaid embodiment.

FIG. 5 is an illustration showing an internal configuration of the lower cabinet 3. To be more specific, FIG. 5 is a perspective view showing the rear side of the rear projector 1 with an exterior casing on the rear side of the lower cabinet 3 being removed from the state shown in FIG. 2. FIG. 6 is a plan view schematically showing the internal configuration of the lower cabinet 3.

The optical unit 4 for forming the image, the control board 5 for entirely controlling the driving of the rear projector 1, the power source unit 6 for supplying the driving power to the electric components, and the like are housed inside the lower cabinet 3. In other words, the optical unit 4, the control board 5, and the power source unit 6 are arranged on the bottom portion 39 of the lower cabinet 3 along the screen 2B held by the upper cabinet 2. Accordingly, main processing such as image formation etc. of the rear projector 1 is performed by the components housed inside the lower cabinet 3.

As shown in FIGS. 5 and 6, the optical unit 4 is disposed on the right side relative to the approximate center of the lower cabinet 3, namely, on the left side when seen from the rear side. On the other hand, the control board 5 and the power source unit 6 are disposed on the left side relative to the approximate center of the lower cabinet 3, namely, on the right side relative to the approximate center when seen from the rear side.

3. Configuration of Optical Unit 4

Figure 7:
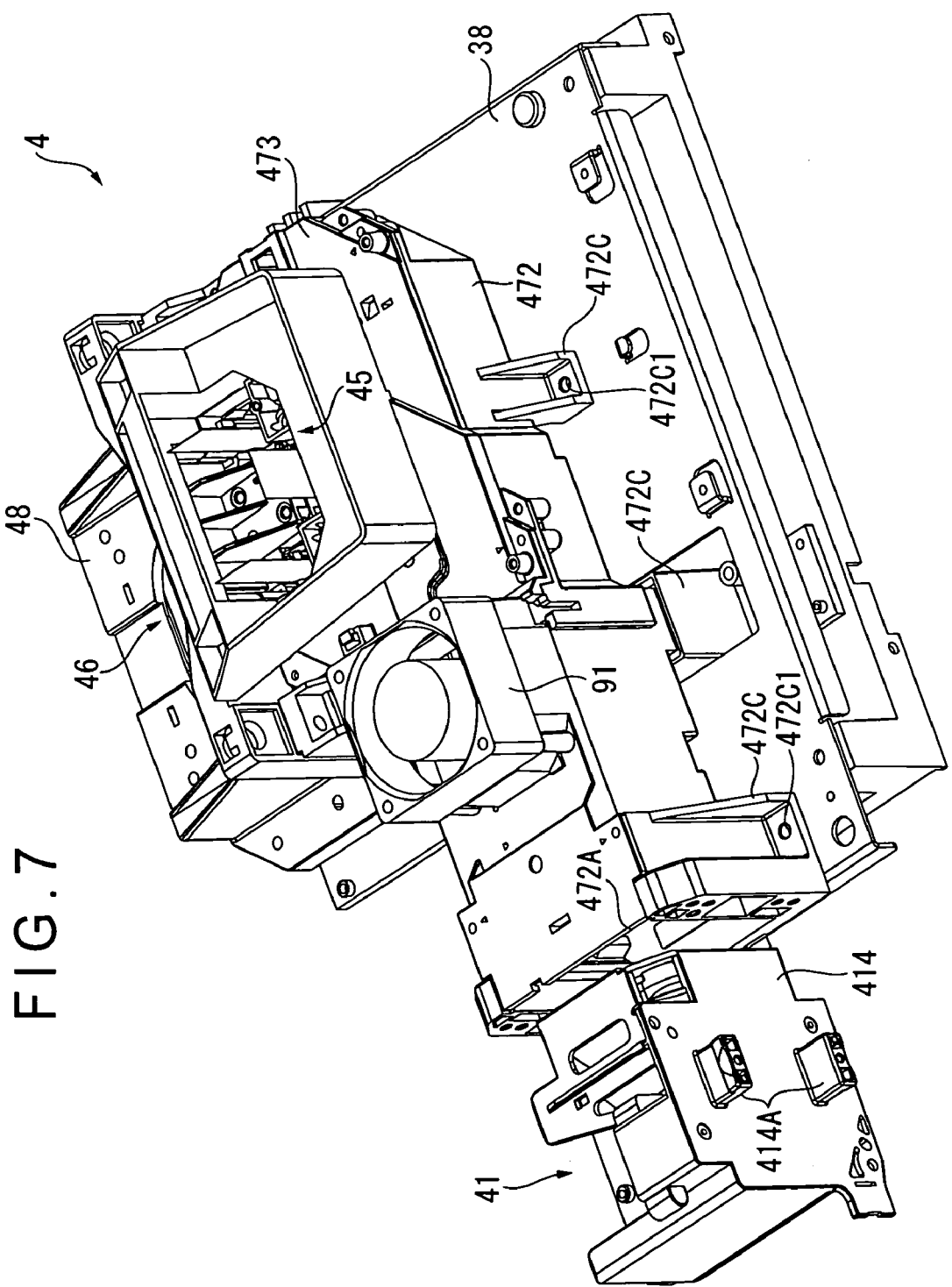
FIG. 7 is a perspective view showing an optical unit of aforesaid embodiment.

FIG. 7 is a perspective view showing the optical unit 4. FIG. 8 is a schematic illustration showing an optical system of the optical unit 4.

The optical unit 4 constitutes the image display section of the invention together with the above-described screen. The optical unit 4, with use of a liquid crystal panel 451, modulates the light beam irradiated by the light source device 41 in accordance with image information to be input to form an optical image, and, with use of the projection lens 46, projects the formed optical image on the screen 2B (FIG. 1) in an enlarged manner via the reflection mirror 2A (FIG. 4). As shown in FIG. 7, the optical unit 4 is mounted on an optical unit mount table 38 provided on an upper surface of the bottom portion 39 of the lower cabinet.

The optical unit mount table 38 is a plate member formed by a plurality of plates for fixing the optical unit 4 at a predetermined position.

As shown in FIG. 8, the optical unit 4 includes a light source device 41, an integrator illuminating optical system 42, a color-separating optical system 43, a relay optical system 44, an electrooptic device 45, the projection lens 46 as a projection optical device, an optical component casing 47 for housing these components, and a head portion 48 for holding and fixing the projection lens 46.

The light source device 41 includes a light source lamp 411 as a radial light source, a reflector 412, an anti-explosion glass 413, and a light source lamp box 414 that is a casing made of a synthetic resin for housing these components. With the light source device 41, a radial light beam irradiated by the light source lamp 411 is reflected by the reflector 412 to be a parallel light beam, and the parallel light beam is irradiated to the outside through the anti-explosion glass 413.

The light source lamp 411 employs a high-pressure mercury lamp in the present exemplary embodiment. Incidentally, the light source lamp 411 may not be the high-pressure mercury lamp but may be a metal halide lamp or a halogen lamp etc. In addition, though the reflector 412 employs a parabolic mirror, a combination of a parallelizing concave lens and an ellipsoidal mirror may be used instead of the parabolic mirror.

The anti-explosion glass 413 is a light-transmissive glass member for closing an opening of the reflector 412, the anti-explosion glass 413 preventing pieces of the light source lamp 411 from dispersing to the outside of the light source lamp box 414 when the light source lamp 411 explodes.

As shown in FIG. 7, a pair of handles 414A that extend toward the rear side direction when the light source device 41 is housed in the rear projector 1 are formed on the light source lamp box 414, so that the light source lamp box 414 can be handled easily. When the light source device 41 is necessary to be replaced because of the life end, or explosion etc. of the light source lamp 411, the above-described lamp cover 34B (FIG. 2) is opened, so that the whole light source device 41 can be replaced through the lamp replacement opening 34A (FIG. 2).

The integrator illuminating optical system 42 is an optical system for substantially uniformly illuminating image formation areas of three liquid crystal panels 451 described later of the electrooptic device 45. As shown in FIG. 8, the integrator illuminating optical system 42 has a first lens array 421, a second lens array 422, a polarization converter 423 and a superposing lens 424.

The first lens array 421 has small lenses arranged in a matrix, the lenses being a substantially rectangular profile as seen in an illumination optical axis direction, the respective lenses separating the light beam irradiated by the light source device 41 into a plurality of sub-beams.

The second lens array 422 is arranged approximately in the same manner as the first lens array 421, the first lens array 422 including small lenses arranged in a matrix. The second lens array 422 focuses the image of the small lenses of the first lens array 421 onto the liquid crystal panels 451 together with the superposing lens 424.

The polarization converter 423 corresponds to an optical converter of the invention and is disposed between the second lens array 422 and the superposing lens 424. The polarization converter 423 converts the light from the second lens array 422 into a substantially uniform linear polarization light, thereby enhancing the light utilization efficiency of the electrooptic device 45.

Specifically, the sub-beams converted into the substantially uniform linear polarization light by the polarization converter 423 is to be substantially superposed on the later-described liquid crystal panels 451 of the electrooptic device 45 by the superposing lens 424. Since only one-type of linear light can be used in the rear projector 1 using the liquid crystal panels 451 that modulate polarized light, approximately half of the light beam from the light source lamp 411 emitting a random polarized light cannot be used. Accordingly, with the use of the polarization converter 423, the light beam irradiated by the light source lamp 411 is converted into the substantially uniform linear polarization light to enhance the light utilization efficiency of the electrooptic device 45.

Incidentally, such polarization converter 423 is disclosed in, for instance, JP-A-8-304739.

The color-separating optical system 43 has two dichroic mirrors 431 and 432, and a reflection mirror 433, and separates the sub-beams irradiated from the integrator illuminating optical system 42 by the dichroic mirrors 431 and 432 into three color lights of red (R), green (G) and blue (B).

The relay optical system 44 has an incident-side lens 441, a relay lens 443 and reflection mirrors 442 and 444, and guides red light separated by the color-separating optical system 43 to a liquid crystal panel 451R for red light (described later) of the electrooptic device 45.

At this time, the dichroic mirror 431 of the color-separating optical system 43 transmits the red light component and green light component of the light beam irradiated by the integrator illuminating optical system 42 and reflects blue light component. The blue light reflected by the dichroic mirror 431 is reflected by the reflection mirror 433, which reaches to a liquid crystal panel 451B for blue light (described later) of the electrooptic device 45 through the corresponding field lens 455. The field lens 455 converts the respective sub-beams irradiated by the second lens array 422 into a light beam parallel to the central axis (main beam) thereof. The field lenses 455 provided on the light-incident side of other optical modulators for green light and red light function in the same manner.

In the red and green lights passed through the dichroic mirror 431, the green light is reflected by the dichroic mirror 432, and reaches to a liquid crystal panel 451G for green light through the corresponding field lens 455. On the other hand, the red light passes through the dichroic mirror 432, and then through the relay optical system 44 and the field lens 455 to reach the liquid crystal panel 451R for red light through the corresponding field lens 455.

Incidentally, the relay optical system 44 is used for the red light in order to avoid deterioration in the light utilization efficiency on account of light dispersion and the like caused by the longer length of the optical path of the red light than the optical paths of other color lights. In other words, the relay optical system 44 is used for directly transmitting the sub-beams incident on the incident-side lens 441 to the field lens 455. Note that, though the red light of the three color lights passes through the relay optical system 44, the blue light or the green light, for instance, may alternatively pass through the relay optical system 44.

The electrooptic device 45 modulates the light beam incident thereon in accordance with image information to form a color image, which includes three incident-side polarization plates 452 on which the respective color lights separated by the color-separating optical system 43 enter, the three liquid crystal panels 451 (optical modulators) (liquid crystal panel 451R for red light, liquid crystal panel 451G for green light and liquid crystal panel 451B for blue light) disposed on the downstream in the optical path of the respective incident-side polarization plates 452, three irradiation-side polarization plates 453 disposed on the downstream in the optical path of the respective liquid crystal panels 451, and a cross dichroic prism 454 (color-combining optical system). The incident-side polarization plates 452, the liquid crystal panels 451, the irradiation-side polarization plates 453 and the cross dichroic prism 454 are integrated as a unit. Incidentally, though not shown in detail, the incident-side polarization plate 452, the liquid crystal panel 451, and the irradiation-side polarization plate 453 are arranged with predetermined intervals.

The respective color lights with their polarization direction aligned in a substantially uniform direction by the polarization converter 423 are incident on the incident-side polarization plates 452, which only transmit the polarized light having substantially the same direction as the polarization axis of the light beam aligned by the polarization converter 423 and absorb the other incident light beams. The incident-side polarization plate 452 has a light-transmissive substrate made of sapphire glass, crystal or the like with a polarization film attached on the substrate.

Although not shown in detail, the liquid crystal panel 451 is a pair of glass boards with a liquid crystal (electrooptic material) sealed therebetween, which modulates the polarization direction of the polarized light beam irradiated by the incident-side polarization plate 452 with orientation of the liquid crystal within the image formation area controlled in accordance with a drive signal output from the below-described control board.

The irradiation-side polarization plate 453 substantially has the same configuration as the incident-side polarization plate 452, namely, the irradiation-side polarization plate 453 passes the light beams with the polarization axis orthogonal to a transmission axis of the light beam of the incident-side polarization plate 452 and absorbs other light beam, out of the light beam irradiated from the image formation area of the liquid crystal panel 451.

The cross dichroic prism 454 is an optical element for combining the optical images irradiated by the irradiation-side polarization plates 453 and modulated for each color light to form a color image. The cross dichroic prism 454 is square in plan view formed by attaching four right-angle prisms, two dielectric multi-layer films being formed on the boundaries where the right-angle prisms are attached to each other. The dielectric multi-layered films reflect the color lights irradiated by the liquid crystal panels 451R and 451B and transmitted through the irradiation-side polarization plates 453, and transmit the color light irradiated by the liquid crystal panel 451G and transmitted through the irradiation-side polarization plate 453. The respective color lights modulated by the respective liquid crystal panels 451R, 451G and 451B are combined to form the color image.

The projection lens 46 houses a plurality of lenses and mirrors for deflecting the incident light beam within a lens barrel, the projection lens 46 enlarging a color image irradiated from the electrooptic device 45, and projecting the color image in an enlarged manner toward the reflection mirror 2A (FIG. 4), namely, projecting the color image irradiated to the front side, toward the upper direction by bending the color image. As shown in FIG. 8, the projection lens 46 is disposed on the light irradiation side of the electrooptic device 45 and fixed in the below-described head portion 48. In addition, as shown in FIG. 4, the projection lens 46 is disposed substantially at the center on the front side of the lower cabinet 3 to be exposed to the inside of the mirror case 21 through the cut portion 212A formed in the bottom wall 212 of the above-described upper cabinet 2.

As shown in FIG. 8, a predetermined illumination optical axis A is set inside the optical component casing 47, and the above-described optical components 42 to 45 are disposed at predetermined positions relative to the illumination optical axis A. As shown in FIGS. 7 and 8, the optical component casing 47 includes a light source device housing member 471, a component housing member 472, and a lid member 473.

Though not shown in detail, the light source device housing member 471 is formed in a box having a substantially U-shaped cross section being opened to the rear side. When the light source device 41 is housed in the light source device housing member 471, the light source lamp box 414 is slid relative to the light source device housing member 471 toward the front side. On the other hand, when the light source device 41 is removed from the light source device housing member 471, the light source lamp box 414 is slid toward the rear side.

The light source device housing member 471 is connected to the component housing member 472, and an opening 471A allowing the light beam irradiated by the light source lamp 411 of the light source device 41 to pass through is formed at the connecting portion with the component housing member.

The component housing member 472 is a box casing made of a synthetic resin having a substantially U-shaped cross section being opened to the upper side. As described above, the component housing member 472 is connected with the light source device housing member 471 at an end thereof, and is connected with the head portion 48 for holding and fixing the electrooptic device 45 and the projection lens 46 at the other end thereof. In the end of the component housing member 472 on a side being connected with the light source device housing member 471, a substantially rectangular opening 472A is formed so that the light beam irradiated by the light source device 41 that is housed in the light source device housing member 471 passes through the component housing member 472.

A plurality of grooves are formed inside the component housing member 472, so that the above-described optical components 421 to 424, 431 to 433, 441 to 444, and 455 are fitted to the grooves from the upper side for positioning and fixing the optical components.

As shown in FIG. 8, cut portions 472B that are light beam passing openings for passing the light beam are respectively formed in end surfaces of light-irradiation ends each being a U-shape in plan view for irradiating the light beam irradiated by the light source lamp 411 of the light source device 41 and guided at the inside, and field lenses 455 are attached to peripheral edges of the cut portions 472B to close the cut portions 472B.

Also, as shown in FIG. 7, a plurality of legs 472C are formed on an external surface of the component housing member 472. The legs 472C fix the component housing member 472 relative to the optical unit mount table 38. Thus, the component housing member 472 is fixed on the optical unit mount table 38 by screws via holes 472C1 formed in the legs 472C.

Figure 11:
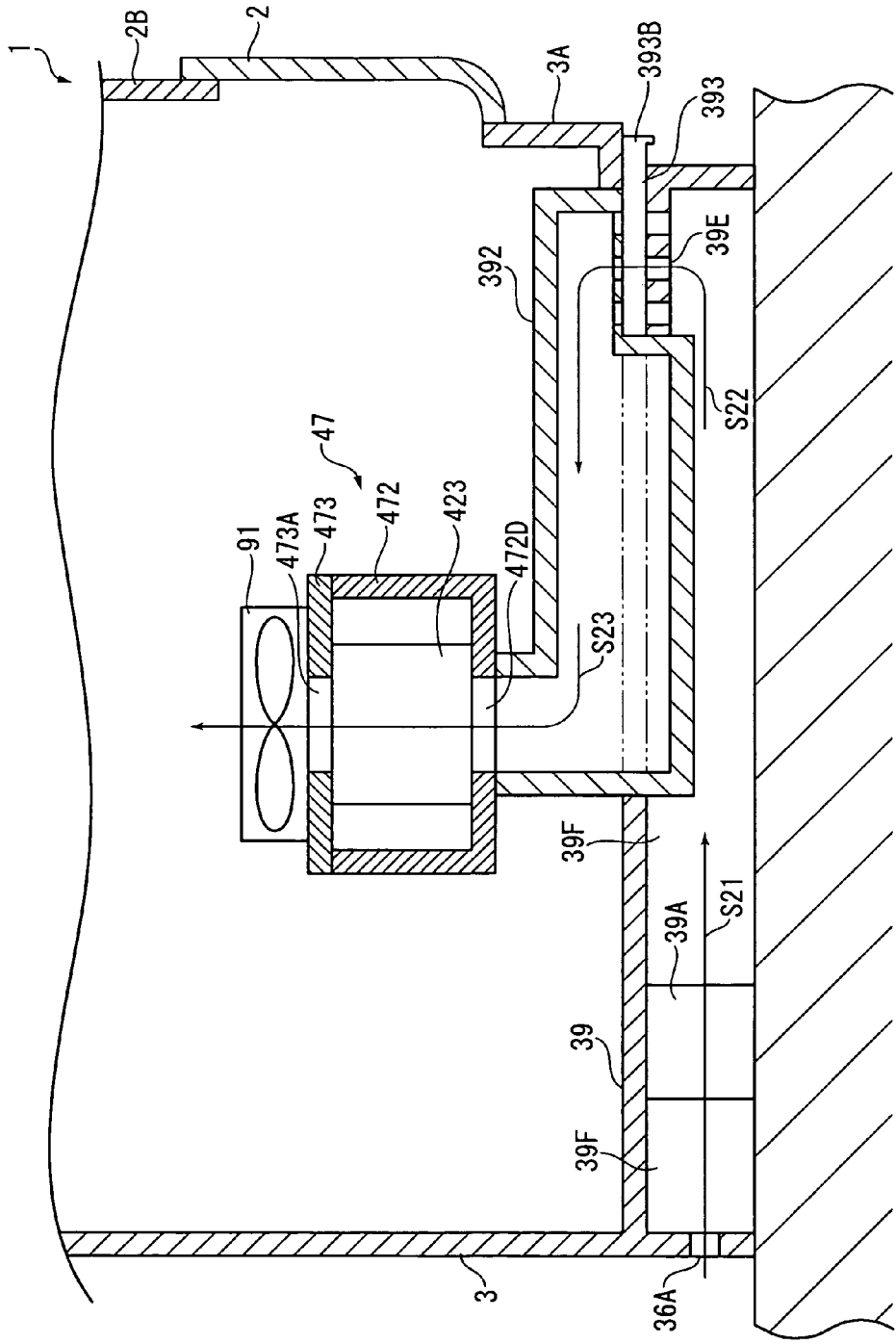
FIG. 11 is an illustration schematically showing a cross section of the rear projector along XI-XI line in FIG. 9.

In addition, as shown in FIG. 11, an opening 472D for exposing the polarization converter is formed in the component housing member 472 at a position corresponding to the lower side of the polarization converter 423. A below-described duct 392 is connected to the opening 472D, so that air for cooling the polarization converter 423 is introduced. Note that the duct 392 will be described below in detail.

As shown in FIG. 7, the lid member 473 is a casing made of a synthetic resin being a profile corresponding to a planar profile of the component housing member 472 and being attached to close an upper opening of the component housing member 472.

Though it will be described below in detail, as shown in FIG. 11, an opening 473A is formed in the lid member 473 at a position corresponding to the position of the polarization converter 423. Also, a cooling fan 91 is formed above the opening 473A for cooling the polarization converter 423.

As shown in FIG. 8, the head portion 48 for holding and fixing the projection lens 46 is attached at an end on the light irradiation side of the component housing member 472.

The head portion 48 is formed by metal material such as an aluminum alloy or a magnesium alloy, which integrates the electrooptic device 45 and the projection lens 46 and attaches the integrated unit relative to the optical component casing 47.

Though not shown in detail, the head portion 48 being a substantially inversed T-shape in side view includes a horizontal portion 481 on the light incident side, a horizontal portion 482 on the light irradiation side, and a vertical portion 483 sandwiched between the horizontal portions 481, 482 and perpendicularly standing on the horizontal portions 481, 482.

The electrooptic device 45 is fixed on the horizontal portion 481 on the light incident side, whereas the projection lens 46 is fixed on the horizontal portion 482 on the light irradiation side. Also, an opening 483A for guiding the light beam irradiated from the electrooptic device 45 to the projection lens 46 is formed in the vertical portion 483.

4. Configuration of Control Board 5

The control board 5 is disposed on the left side of the projection lens 46 when the rear projector 1 is seen from the front side, namely, is vertically disposed on the slightly right side relative to the center shown in FIGS. 5 and 6 In order to avoid EMI (Electromagnetic Interference), the control board 5 is covered by a metal shield member with a plurality of holes. The control board 5 is a circuit board on which a CPU (Central Processing Unit), a ROM (Read Only Memory), a RAM (Random Access Memory), etc. are mounted, the control board 5 entirely controling the rear projector 1 (FIG. 1) including the optical unit 4 (FIGS. 5 and 8) and the liquid crystal panels 451 (FIG. 8) by processing image information input from the respective connecting terminals provided on the front panel and the rear panel 35B (FIG. 2), and an operation signal from operation buttons arranged on the front panel.

5. Configuration of Power Source Unit 6

The power source unit 6 converts AC input from the outside into DC to supply the driving power to the respective electric components of the rear projector 1 (FIG. 1).

As shown in FIGS. 5 and 6, the power source unit 6 disposed on the right side of the lower cabinet 3 includes the power source block 61 connected with the power source cable 35A (FIG. 2), and a light source driving block 62 disposed on the front side of the light source device housing member 471 for supplying the driving power to the light source lamp 411 (FIG. 8) of the light source device 41.

The power source block 61 converts commercial AC into DC, increases/decreases the voltage of the power to a level corresponding to the respective electric components, and then supplies the power to the electric components such as the light source driving block 62, the control board 5 and the like.

The light source driving block 62 rectifies and transforms the DC supplied from the power source block 61 to generate AC square-wave, and supplies the AC square-wave to the light source lamp 411 (FIG. 8) of the light source device 41. The light source driving block 62 is electrically connected to the above-described control board 5, so that the control board 5 controls lighting of the light source lamp 411 (FIG. 8) through the light source driving block 62.

6. Configuration of Bottom Portion 39 of Lower Cabinet 3

Figure 9:
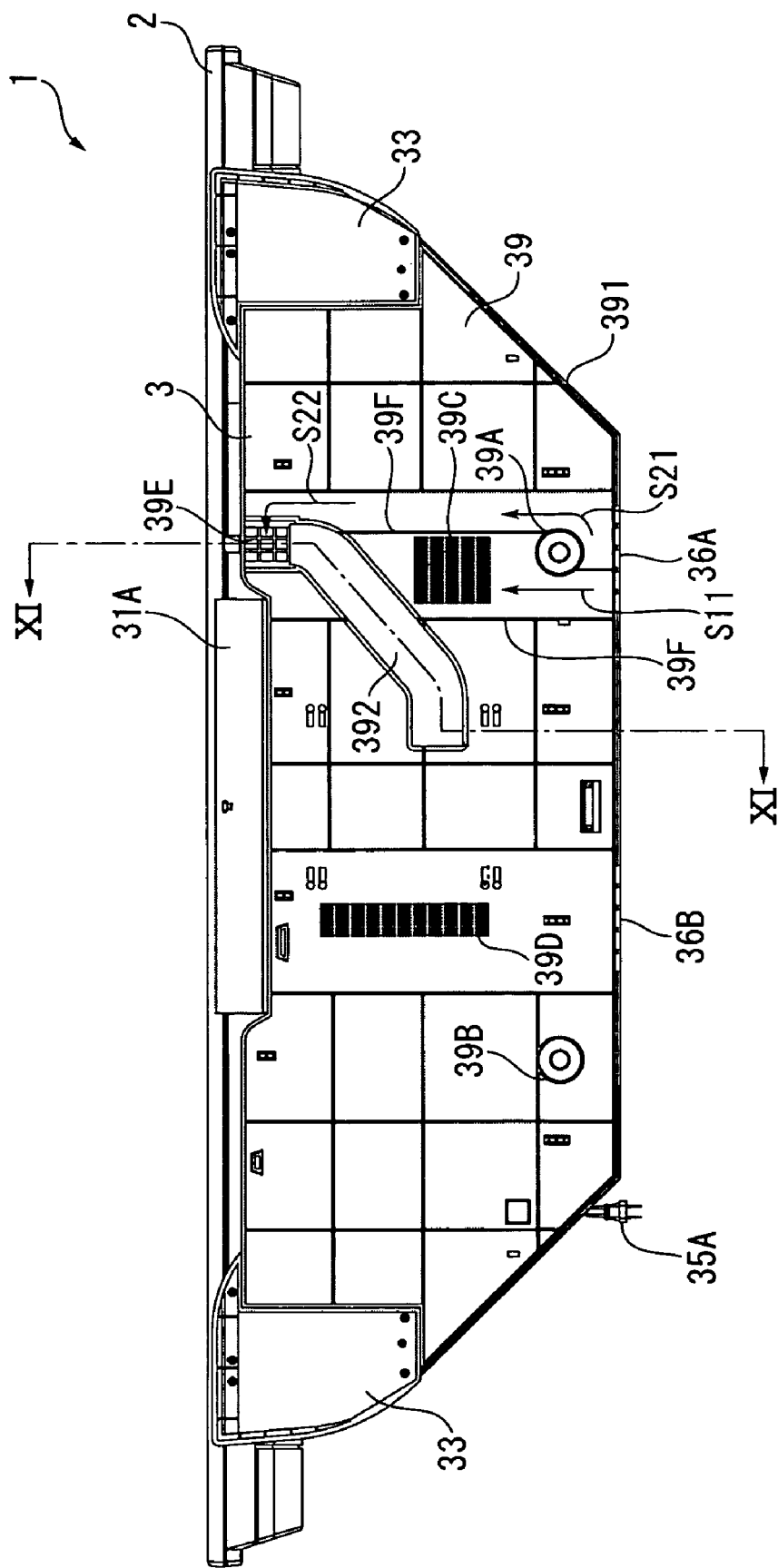
FIG. 9 is a perspective view showing a lower side of a bottom portion of the lower cabinet of aforesaid embodiment.

FIG. 9 is an illustration showing a lower side of the rear projector 1. Namely, FIG. 9 is an illustration showing a lower side of the bottom portion 39 of the lower cabinet 3.

The bottom portion 39 (FIGS. 2 and 9) is formed on an upper surface of the lower cabinet 3 of the rear projector 1, the above-described optical unit 4 (FIGS. 5 and 6), the control board 5 (FIGS. 5 and 6), the power source unit 6 (FIGS. 5 and 6), and the like being mounted on the bottom portion 39. The bottom portion 39 is a surface extending from the front portion 3A (FIG. 1) of the lower cabinet 3 in other words, from a lower end of a surface on which the screen 2B (FIG. 1) of the rear projector 1 is provided, to the rear side direction, and as shown in FIG. 9, the above-described legs 33 are provided on both the lateral ends on a lower surface of the bottom portion 39.

On the bottom portion 39, a frame leg 391 is extended from an outer edge of the bottom portion 39.

The frame leg 391 corresponds to a leg of the invention, the frame leg 391 defining a predetermined space between the bottom portion 39 and a mount surface such as a mount table. The above-described intake ports 36A, 36B are formed on the rear side of the frame leg 391, thereby forming an air layer below the bottom portion 39, i.e., between the bottom portion 39 and the mount surface. Accordingly, the air introduced from the outside of the rear projector 1 through the intake ports 36A, 36B circulates below the bottom portion 39.

Note that, since the intake ports 36A, 36B are formed on the rear side of the frame leg 391, the intake ports 36A, 36B cannot be visually recognized from the side of viewing the rear projector 1, i.e., from the front side, thus making the intake ports 36A, 36B be less noticeable.

In addition, legs 39A, 39B being substantially circular in plan view are formed on horizontally symmetrical positions on the rear side of the bottom portion 39.

In addition, three openings 39C, 39D, 39E and a rib 39F are formed in the bottom portion 39.

Specifically, the opening 39C is formed at a position on a slightly right side relative to the center shown in FIG. 9, i.e., at a position corresponding to the light source device 41 (FIGS. 6 and 8), the profile thereof corresponding to the profile of the light source device 41 (FIGS. 6 and 8). The opening 39C introduces the air taken in from the outside through the intake port 36A toward the inside of the lower cabinet 3. Though not shown in detail, the air introduced through the opening 39C is sucked by a cooling fan disposed above the light source device 41 (FIGS. 6 and 8). Then, the air circulates along the light source device 41 and the light source driving block 62 while the air cools the light source device 41 and the light source driving block 62 (shown in FIG. 6) and is discharged to the outside from the exhaust port 37A (FIG. 2) via the cooling fan, when is sucked by the cooling fan.

The substantially rectangular opening 39D is formed at a position on a slightly left side relative to the center shown in FIG. 9, i.e., at a position spanning the control board 5 shown in FIGS. 5 and 6 and the cooling fan (not shown) provided between the control board 5 and the power source block 61. The opening 39D introduces the air introduced from the outside of the rear projector 1 through the intake port 36B toward the inside of the lower cabinet 3. Though not shown in detail, the air introduced through the opening 39D is sucked by a cooling fan disposed between the control board 5 and the power source block 61. Then, the air cools the control board 5 and circulates along the control board 5 when the air is sucked by the cooling fan. Thereafter, the cooling fan sucks the air after cooling the control board 5, sends the air to the power source block 61 to cool the power source block 61. The air after cooling the power source block 61 is discharged from the exhaust ports 37B, 37C (FIG. 2) to the outside.

As shown in FIG. 9, the opening 39E is located on an extending line connecting the intake port 36A and the opening 39C, and is formed on the front side of the bottom portion 39 to come closer to the front portion 3A. The opening 39E introduces the air from the outside of the rear projector 1 through the intake port 36A toward the inside of the lower cabinet 3 via the below-described duct 392. Thought it will be described below in detail, the air introduced from the opening 39E is supplied to the polarization converter 423 (FIG. 8) of the optical unit 4 (FIG. 8) for cooling the polarization converter 423 (FIG. 8).

The rib 39F secures the strength of the bottom portion 39, and is downwardly extended from the lower surface of the bottom portion 39 vertically and horizontally. The rib 39F is not formed in an area from the intake port 36A to the openings 39C, 39E, or in an area from the intake port 36B to the opening 39D. Owing to this, when the rear projector 1 is mounted on the mount surface, the rib 39F serves as a duct-like partition wall for guiding the air that is introduced below the bottom portion 39 from the intake port 36A and the intake port 36B toward the openings 39C, 39E as well as toward the opening 39D. To be more specific, the rib 39F circulates a part of the air introduced from the intake port 36A in an arrow S11 direction shown in FIG. 9 to guide the air to the opening 39C, and circulates the rest of the air in an arrow S21 direction to guide the air to the opening 39E. Also, the rib 39F guides the air introduced from the intake port 36B to the opening 39D. Accordingly, a flow path where the part of the air introduced from the intake port 36A circulates to the light source device 41 (FIGS. 5 and 6) and the light source driving block 62 (FIG. 6) through the opening 39C, a flow path where the rest of the air circulates to the polarization converter 423 (FIG. 8) through the opening 39E, and a flow path where the air introduced from the intake port 36B circulates to the control board 5 (FIGS. 5 and 6) and the power source block 61 (FIGS. 5 and 6) through the opening 39D, can independently be formed.

Figure 10:
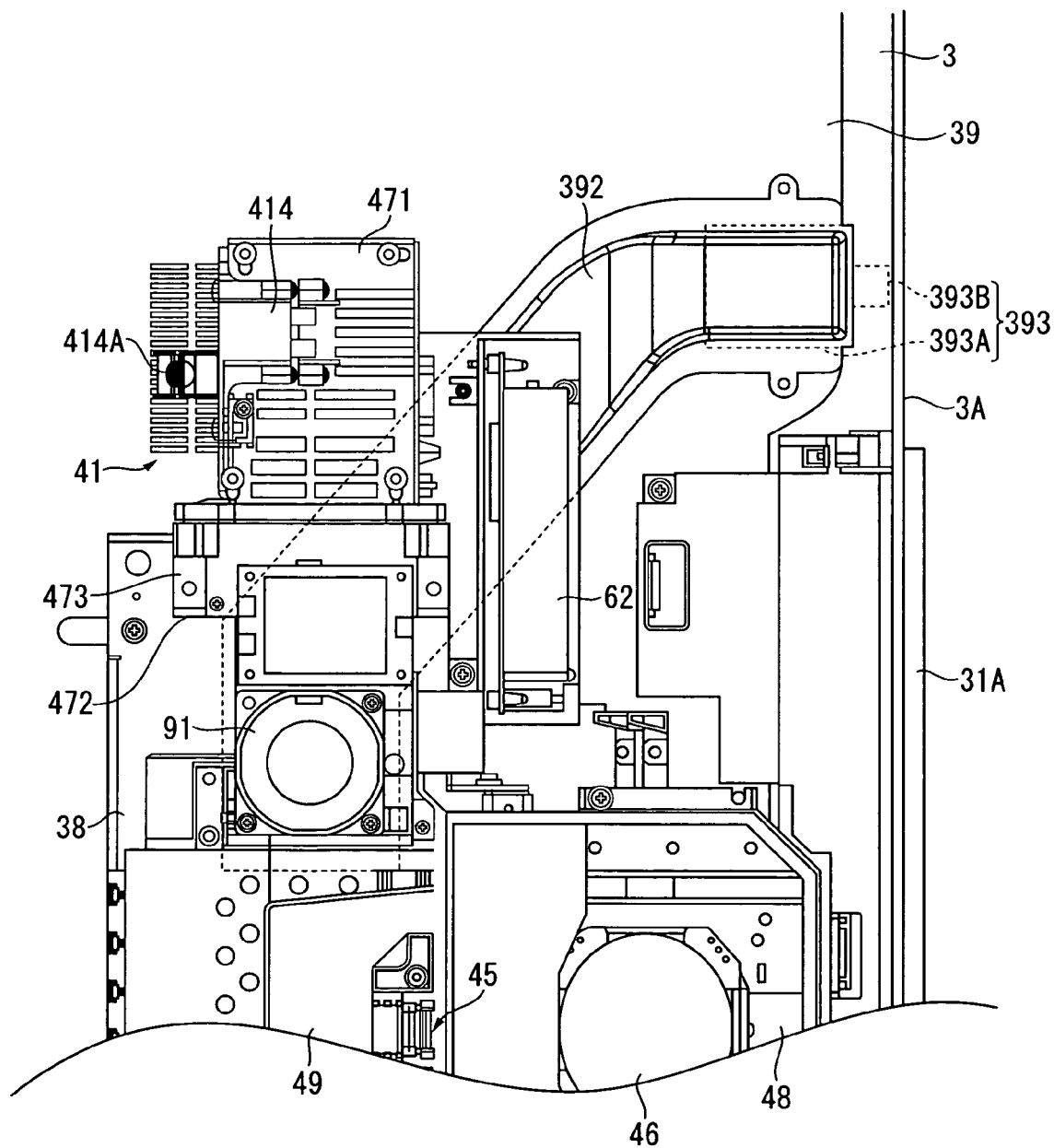
FIG. 10 is an illustration showing positions of a duct and an air filter of aforesaid embodiment.

FIG. 10 is an illustration showing positions of the duct 392 and an air filter 393 provided at the bottom portion 39. Specifically, FIG. 10 is an illustration showing the positions of the duct 392 and the air filter 393 when the bottom portion 39 is seen from the above. FIG. 11 is an illustration schematically showing a cross section of the rear projector 1 along XI-XI line in FIG. 9.

As shown in FIGS. 5 and 11, the duct 392 has a profile protruding to both of the upper side and the lower side of the bottom portion 39. As shown in FIGS. 9, 10 and 11, the duct 392 is provided such that an end thereof is connected with the opening 39E via the air filter 393, and the other end is connected to the optical component casing 47 (FIGS. 7 and 8) of the above-described optical unit 4 (FIGS. 7 and 8). To be more specific, the other end of the duct 392 is connected with the opening 472D formed below the polarization converter 423 (FIGS. 8 and 11) of the component housing member 472 of the optical component casing 47. Due to this, the air introduced via the opening 39E can securely be guided to the lower side of the polarization converter 423, thus sufficiently cooling the polarization converter 423 with the air.

Also, the duct 392 has a profile protruding to not only the upper side but also the lower side of the bottom portion 39, by effectively using the space formed between the bottom portion 39 and the mount surface by the frame leg 391. With this configuration, a sectional area of the duct can be increased, so that the cooling air can effectively circulates. Accordingly, cooling efficiency of the polarization converter 423 can further be enhanced.

As shown in FIGS. 10 and 11, the air filter 393 covers the opening 39E for removing the dust etc. contained in the air taken in via the opening 39E for circulation. The air filter 393 includes a filter portion 393A for removing the dust etc. in the air, and a handle portion 393B.

As shown in FIG. 11, the filter portion 393A is interposed between the opening 39E and the duct 392 to remove the dust etc. in the air circulating inside the duct 392 taken in via the opening 39E. The filter portion 393A may be formed of a urethane foam or the like, which attracts the dust etc.

The handle portion 393B is exposed to the front side of the lower cabinet 3 at an end thereof, so that the air filter 393 can be removed by pulling the handle portion 393B in an arrow Z direction shown in FIG. 10, namely, to the front side, and alternatively the air filter 393 can be inserted by pushing the handle portion 393B in a direction opposite to the arrow Z direction, namely, to the rear side. Owing to this, when the filter portion 393A of the air filter 393 gets dirt, the air filter 393 can easily be replaced from the side of viewing the rear projector 1.

7. Cooling Path of Polarization Converter 423

Next, a cooling path of the polarization converter 423 will be described with reference to FIGS. 9 and 11.

The cooling path of the polarization converter 423 is a path of the air, and in that path, the air introduced from the outside the rear projector 1 via the intake port 36A is sucked by the cooling fan 91 disposed above the polarization converter 423, and to cool the polarization converter 423 when the air is being sucked.

To be more specific, when the cooling fan 91 is driven, the air introduced from the outside the rear projector 1 via the intake port 36A circulates within the area partitioned by the rib 39F formed on the lower surface of the bottom portion 39 and flows in an arrow S21 direction, i.e., in a direction directed to the provision of the opening 39E.

The air circulated to the vicinity of the opening 39E flows in an arrow S22 direction, and flows into the duct 392 through the opening 39E and the air filter 393. The air is then cleaned by removing the dust etc. contained in the air when the air passes the filter portion 393A of the air filter 393, so that the clean air is introduced into the duct 392.

The air flowed into the duct 392 flows in an arrow S23 direction, is introduced into the component housing member 472 via the opening 472D formed in the component housing member 472, and circulates upwardly. The air circulates along the polarization converter 423 when circulating upwardly, and cools the second lens array 422 (FIG. 8) and the superposing lens 424 as well as the polarization converter 423. Incidentally, since the side walls of the component housing member 472, the second lens array 422 (FIG. 8) and the superposing lens 424 (FIG. 8) define a duct-like path of the air inside the component housing member 472, the air introduced inside the component housing member 472 via the opening 472D of the component housing member 472 may flow along both sides on the light incident side and the light irradiation side of the polarization converter 423 to cool the polarization converter 423.

The air provided for cooling the polarization converter 423 is sucked by an intake surface of the cooling fan 91 via the opening 473A of the lid member 473 located above the polarization converter 423, and is discharged to the outside by the cooling fan 91 via the exhaust port 37A formed in the lower cabinet 3.

The cooling fan 91 is disposed such that the intake surface of the cooling fan 91 confronts the polarization converter 423. Accordingly, with the driving of the cooling fan 91, the intake side of the cooling fan 91 becomes negative pressure, so that the air inside the duct 392 flows into the component housing member 472 with a predetermined wind pressure. Therefore, the air for cooling the polarization converter 423 can circulate along the polarization converter 423 without staying. In other words, the air supplied via the duct 392 can collectively be supplied to the polarization converter 423, thus cooling the polarization converter 423 with that air. Accordingly, cooling efficiency of the polarization converter 423 can be enhanced.

With the rear projector 1 according to the above-described present exemplary embodiment, the following advantages can be attained.

In the present exemplary embodiment, the air filter 393 is disposed to cover the opening 39E formed in the bottom portion 39 of the lower cabinet 3. With this arrangement, the dust etc. can be removed from the air introduced into the lower cabinet 3 via the opening 39E and can be prevented from entering into the rear projector 1, and also, the clean air can be provided for cooling the polarization converter 423.

Further, in the rear projector 1, the air filter 393 may be inserted to/removed from the front side. With this arrangement, in a case where the rear projector 1 is operated for long term, the air filter 393 that may be clogged with the dust etc. may easily be replaced. In other words, when compared to a case where the air filter 393 is disposed on the left or right surface, or on a rear surface of the rear projector 1, the rear projector 1 is not required to be moved, and the air filter 393 can easily be replaced from the direction of viewing the rear projector 1. Thus, the replacement can easily be performed.

The lower surface of the bottom portion 39 of the lower cabinet 3 is surrounded by the frame leg 391 substantially extending downwardly from the outer edge of the bottom portion 39, and the intake ports 36A, 36B for introducing the air outside the rear projector 1 to the openings 39C, 39E as well as the opening 39D formed in the bottom portion 39 are formed in the frame leg 391. With this arrangement, the air layer can be defined between the bottom portion 39 and the mount surface on which the rear projector 1 is mounted, so that the openings 39C, 39D, 39E formed in the bottom portion 39 can be prevented from being closed with the mount surface, when the rear projector 1 is mounted. In addition, the air introduced from the outside of the rear projector 1 via the intake ports 36A and 36B can be supplied to the openings 39C, 39E as well as to the opening 39D. Therefore, even when the rear projector 1 is mounted on the mount surface, since the air introduced via the intake ports 36A, 36B circulates below the bottom portion 39 and is introduced into the lower cabinet 3 via the openings 39C, 39E, 39D, the flow path of the air can securely be formed for cooling the light source device 41 and the light source driving block 62 disposed inside the lower cabinet 3, the polarization converter 423, the control board 5 and the power source block 61.

Also, since the flow path of the air being introduced from the intake port 36A and circulating inside the lower cabinet 3 via the opening 39E is separated from the flow path of the air being introduced from the same intake port 36A and circulating inside the lower cabinet 3 via the opening 39C, the air outside the rear projector 1 can securely be supplied to the polarization converter 423, the light source device 41 and the light source driving block 62, thereby sufficiently cooling these components. Incidentally, when one of the cooling fan 91 located above the polarization converter 423 or the cooling fan (not shown) located above the light source device 41 has a suction force greater than the other one, the air may possibly flow to the cooling fan with the greater suction force in a substantially unilateral way. Also, since the opening 39C for circulating the air to the light source device 41 and the light source driving block 62 is formed at the position close to the intake port 36A, even when the suction force of the cooling fan 91 located above the polarization converter 423 is substantially the same as the suction force of the cooling fan located above the light source device 41, most of the air may possibly flow to the light source device 41 and the light source driving block 62.

In contrast, since the rib 39F separates these flow paths to realize the independence, the proper amount of the air can be supplied by each of the cooling fans. Accordingly, the polarization converter 423, the light source device 41 and the light source driving block 62 are properly be cooled.

8. Modification of Exemplary Embodiment

Although the best configuration for implementing the invention is disclosed above, the invention is not restricted thereto. In other words, while the invention is mainly illustrated and described on the specific exemplary embodiments, a person skilled in the art can modify the specific arrangement such as shape, material, quantity in the above-described exemplary embodiments as long as a technical idea and an object of the invention can be achieved.

Therefore, the description limiting the shapes and the materials disclosed above is intended to be illustrative for easier understanding and not to limit the invention, hence the invention includes the description using a name of component without a part of or all of the limitation on the shape and the material etc.

In the above-described exemplary embodiment, in order to form the air layer between the mount surface and the bottom portion 39, the frame leg 391 substantially extending downwardly from the outer edge of the bottom portion 39 is formed at the lower cabinet 3 and the intake port 36A is formed in the frame leg 391 for circulating the air introduced from the outside of the rear projector 1 via the intake port 36A to the lower side of the bottom portion 39. However, the invention is not limited thereto. In other words, the lower surface of the bottom portion 39 may be formed flat. In this case, it is only required to interpose other member between the bottom portion 39 and the mount surface such that the openings 39C, 39D, 39E formed in the bottom portion 39 will not be closed.

Alternatively, the bottom portion 39 may be formed by a pair of plate members disposed with a predetermined space therebetween, so that the optical unit 4 is mounted on the upper plate member disposed above, and a lower surface of the other plate member is flat. Namely, the bottom portion 39 may be formed to keep the predetermined space below the surface where the optical unit 4 is mounted.

In the above-described exemplary embodiment, although the intake ports 36A, 36B are formed in the rear side of the frame leg 391, the invention is not limited thereto, and the intake ports 36A, 36B may be formed in the front side or the left/right side. Note that, by forming the intake ports 36A, 36B in the rear side, the intake ports 36A, 36B may be less noticeable.

In the above-described exemplary embodiment, although the air introduced from the intake port 36A circulates to the polarization converter 423 via the opening 39E, the air filter 393 and the duct 392, the invention is not limited thereto, and the air may circulate to the liquid crystal panel 451 (optical modulator), the incident-side polarization plate 452, the irradiation-side polarization plate 453 (optical converting component), or the like. Alternatively, the air can circulate to other electric components without limiting to the above-described components. Note that, when the air introduced from the intake port 36A circulates to the polarization converter 423, the liquid crystal panel 451 and the like via the air filter 393 that is provided to be inserted to/removed from the front side of the rear projector 1, the clean air with the dust etc. removed can continuously be supplied to these optical components by replacing the air filter 393 as required. Thus, these components can properly be cooled, and also deterioration of the image, e.g., appearance of the dust as a shadow can be avoided.

In the above-described exemplary embodiment, although the air passed through the air filter 393 circulates to the polarization converter 423 via the duct 392, the invention is not limited thereto, and the air passed through the air filter 393 may circulate directly to the polarization converter 423. Note that, since the air is guided by the duct 392, possibility of dispersion of the air in the case of the direct circulation etc. can be avoided, thus securely blowing with the air the polarization converter 423 connected to the lower side of the duct 392. Incidentally, even when the duct 392 is connected to the lower side of the liquid crystal panel 451 instead of the polarization converter 423, the same advantage can be attained.

In the above-described exemplary embodiment, although the cooling fan 91 is disposed above the polarization converter 423 (cooling subject) such that the intake surface confronts the polarization converter 423, the invention is not limited thereto, and the cooling fan may be disposed below the polarization converter 423 such that the exhaust port thereof confronts the polarization converter 423. In this case, it is only required that the end of the duct 392 is connected to the opening 39E via the air filter 393, and the other end thereof is connected to the intake surface of the cooling fan. Note that, like the above-described exemplary embodiment, when the cooling fan 91 is disposed such that the intake surface thereof confronts the polarization converter 423, the driving of the cooling fan 91 allows the air to circulate to the polarization converter 423 collectively without dispersion, thereby enhancing the cooling efficiency of the polarization converter 423. Incidentally, the same advantages can be attained even when the liquid crystal panel 451 or other optical component is the cooling subject.

In the above-described exemplary embodiment, although the opening 39E to which the air filter 393 is provided is formed in the front side of the bottom portion 39 to be close to the front portion 3A, the invention is not limited thereto, and the position of the opening 39E in the bottom portion 39 may appropriately be determined.

In the above-described exemplary embodiment, although the rear projector utilizing the tree optical modulators is employed, the invention is not limited thereto, and a rear projector using only one optical modulator, two optical modulators, or four or more optical modulators may be employed. Also, although the liquid crystal panel is employed for the optical modulator, the invention is not limited thereto, and an optical modulator such as a device using a micro mirror may be employed other than the liquid crystal. Further, a reflective-type optical modulator may be used instead of the transmissive optical modulator.

In the above-described exemplary embodiments, an arrangement in which the optical unit 4 substantially is an L-shape in plan view is exemplified, however, for instance, an arrangement employing the optical unit 4 substantially being a U-shape in plan view may also be employed.

In the above-described embodiment, although the rear projector 1 is exemplified as the image display, the invention is not limited thereto, and other device may be employed as long as the device includes an image display section for displaying an image, and a casing for housing the image display section. For example, a CRT (Cathode-Ray Tube) display, a liquid crystal display, a plasma display, or the like may be employed.

The invention can be applied not only to the rear projector, but also to the image display such as a CRT display, a liquid crystal display, a plasma display, or the like, in which an image display section is arranged on a lateral surface of the casing.

What is claimed is:

1. An image display, comprising:
  an image display section for forming and displaying an image in accordance with image information to be inputted; and
  a casing for housing the image display section, the casing being mounted on a mount surface;
  the casing including:
    a lateral portion visible from an outside, the image display section being exposed from the lateral portion; and
    a bottom portion extending from a lower end of the lateral portion along the mount surface toward a rear side of the device;
  an opening for introducing air outside the casing being formed in the bottom portion; and
  an air filter for cleaning the air passing the opening being provided at the opening such that the air filter can be inserted to/removed from the lateral portion.

2. The image display according to claim 1,
  the casing including a leg for defining an air layer between the mount surface on which the casing is mounted and the bottom portion, and
  an intake port for introducing the air outside the casing being formed at the opening of the leg.

3. The image display according to claim 2,
  the leg being provided on at least a side confronting the lateral portion, and
  the intake port being formed in the leg on the side confronting the lateral portion.

4. The image display according to claim 1, the image display section including:
  a light source;
  an optical modulator for modulating a light beam irradiated by the light source in accordance with image informatiom;
  an optical converter that optically converts the light beam incident thereon;
  a screen on which an image formed by the optical modulator is projected, and
  a duct is provided on the bottom portion, an end of the duct being connected to the opening and the other end of the duct being connected to a lower side of at least one of the optical modulator and the optical converter, and the duct guiding the air introduced from the opening to the at least one of the optical modulator and the optical converter.

5. The image display according to claim 4,
  a cooling fan being provided to an upper side of the at least one of the optical modulator and the optical converter with the duct being connected to the lower side thereof the cooling fan cooling the at least one of the optical modulator and the optical converter, and an intake surface of the cooling fan confronting the at least one of the optical modulator and the optical converter with the cooling fan being disposed to the upper side thereof.

6. A rear projector, comprising:

a light source;

an optical modulator for modulating a light beam irradiated by the light source in accordance with image information;

a projection lens for projecting the light beam irradiated from the optical modulator on a screen; and a casing for housing the light source, the optical modulator and the projection lens, the casing being mounted on a mount surface, the casing including bottom portion extending along the mount surface, a front portion intersecting the bottom portion, a rear portion and left and right lateral portions, the screen being held at the front portion, a frame leg being provided, the frame leg being extended from an outer edge of the bottom portion to the mount surface on which the casing is mounted, the frame leg defining a space between the bottom portion and the mount surface, an intake port being provided in the frame leg, the intake port introducing to the space a cooling air for cooling electric components housed in the casing, a first opening being formed in the bottom portion, the first opening introducing inside the casing the cooling air introduced from the intake port in the space, and an air filter for cleaning air passing the first opening being provided at the first opening such that the air filter can be inserted to/removed from the front portion.

7. The rear projector according to claim 6, the intake port being formed on a rear portion side.

8. The rear projector according to claim 6, a second opening being formed in the bottom portion, the second opening introducing inside the casing the cooling air introduced from the intake port in the space, the first opening being located on an extending line connecting the intake port and the second opening, and a partition wall being formed on the bottom portion, the partition wall separating a flow path of the cooling air from the intake port to the first opening, and a flow path of the cooling air from the intake port to the second opening.

9. The rear projector according to claim 6, further comprising:

an optical converter provided between the light source and the optical modulator, the optical converter converting the light beam irradiated by the light source into a uniform linear polarization light, a duct being provided on the bottom portion, an end of the duct being connected to the first opening and the other end of the duct being connected to a lower side of at least one of the optical modulator and the optical converter, the duct guiding to the at least one of the optical modulator and the optical converter the air introduced from the opening to an inside of the casing.

10. The rear projector according to claim 9, the duct having a profile protruding to an upper side and a lower side of the bottom portion.

11. The rear projector according to claim 9, a cooling fan being provided to an upper side of the at least one of the optical modulator and the optical converter with the duct being connected to the lower side thereof, the cooling fan cooling the at least one of the optical modulator and the optical converter, and an intake surface of the cooling fan confronting the at least one of the optical modulator and the optical converter with the cooling fan being disposed to the upper side thereof.

* * * * *